(12) United States Patent
Nomura et al.

(10) Patent No.: US 9,887,798 B2
(45) Date of Patent: Feb. 6, 2018

(54) TRANSMISSION APPARATUS, RECEPTION APPARATUS AND MODULATION METHOD

(71) Applicant: FUJITSU LIMITED, Kawasaki-shi, Kanagawa (JP)

(72) Inventors: Yoshitaka Nomura, Shinagawa (JP); Hisao Nakashima, Kawasaki (JP); Yuichi Akiyama, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/333,671

(22) Filed: Oct. 25, 2016

(65) Prior Publication Data

US 2017/0134115 A1    May 11, 2017

(30) Foreign Application Priority Data

Nov. 11, 2015  (JP) .................................. 2015-221480

(51) Int. Cl.
*H04J 14/02* (2006.01)
*H04B 10/516* (2013.01)

(52) U.S. Cl.
CPC ...... *H04J 14/0298* (2013.01); *H04B 10/5161* (2013.01)

(58) Field of Classification Search
CPC .................. H04J 14/0298; H04B 10/5161
See application file for complete search history.

(56) References Cited

U.S. PATENT DOCUMENTS

2005/0271387 A1   12/2005 Kee et al.
2013/0058648 A1   3/2013 Ji et al.

OTHER PUBLICATIONS

Extended European Search Report dated Apr. 4, 2017 in related European Application No. 16196255.0.
Zhou Xiang et al., "Advanced DSP for 400 Gb/s and Beyond Optical Networks", Journal of Lightwave Technology, IEEE Service Center, vol. 32, No. 16, Aug. 15, 2014, pp. 2716-2725.
Zhou et al., "High Spectral Efficiency 400 Gb/s Transmission Using PDM Time-Domain Hybrid 32-64 QAM and Training-Assisted Carrier Recovery", Journal of Lightwave Technology, vol. 31, No. 7, Apr. 1, 2013, pp. 999-1005.
Oyama et al., "Complexity Reduction of Perturbation-based Nonlinear Compensator by Sub-band Processing", OFC, paper Th3D. 7, 2015, (3 pages).
Savory, "Digital Coherent Optical Receivers: Algorithms and Subsystems", IEEE Journal of Selected Topics in Quantum Electronics, vol. 16, No. 5, Sep./Oct. 2010, pp. 1164-1179.

(Continued)

*Primary Examiner* — Leslie Pascal
(74) *Attorney, Agent, or Firm* — Staas & Halsey LLP

(57) ABSTRACT

There is provided a transmission apparatus configured to transmit an optical signal by using a plurality of subcarriers, the transmission apparatus includes: a plurality of modulators, a modulator of the plurality of modulators configured to be capable of changing a modulation format corresponding to a subcarrier of the plurality of subcarriers; a controller configured to control the modulation format for the modulator so as to use a first modulation format and a second modulation format for two or more subcarriers among the plurality of subcarriers and include subcarriers that are different in at least one of a first timing and a second timing of the first modulation format; and a multiplexer configured to multiplex signals modulated by the plurality of modulators.

15 Claims, 28 Drawing Sheets

(56) References Cited

OTHER PUBLICATIONS

Li et al., "Wide-range, Accurate and Simple Digital Frequency Offset Compensator for Optical Coherent Receivers", OFC/NFOEC 2008, paper OWT4, Feb. 2008, (3 pages).
Ly-Gangnon et al., "Coherent Detection of Optical Quadrature Phase-Shift Keying Signals With Carrier Phase Estimation", Journal of Lightwave Technology, vol. 24, No. 1, Jan. 2006, pp. 12-21.

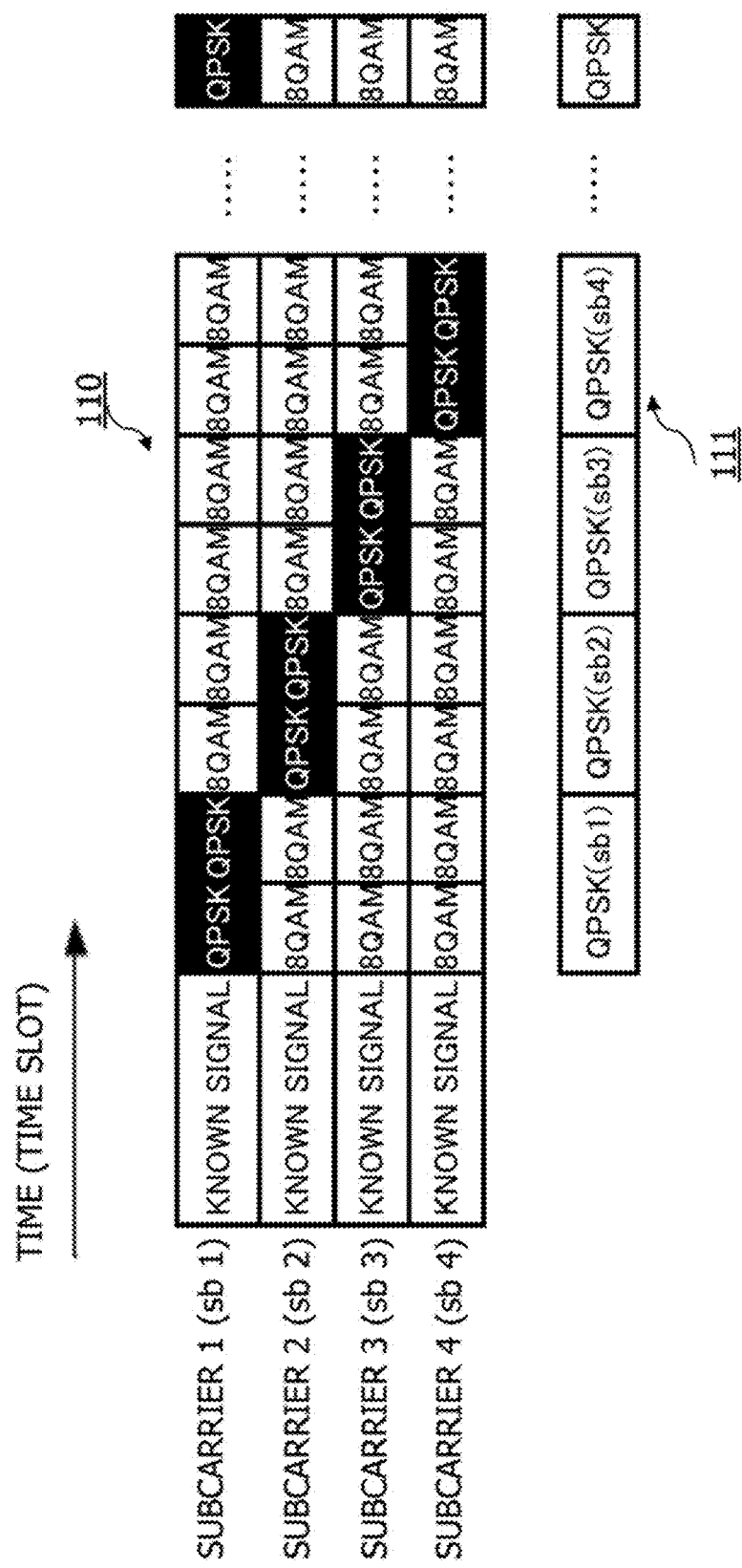

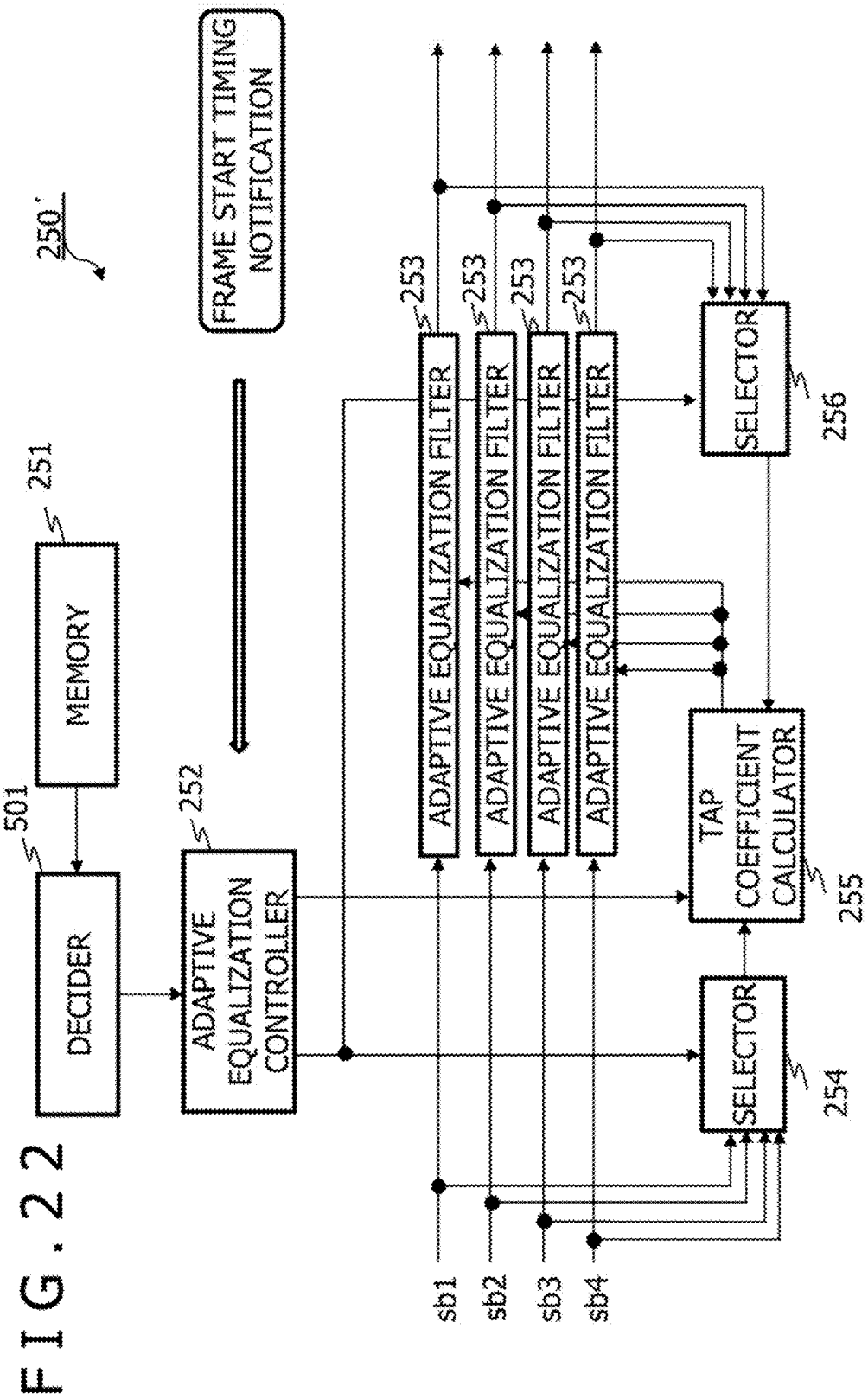
F I G . 2 2

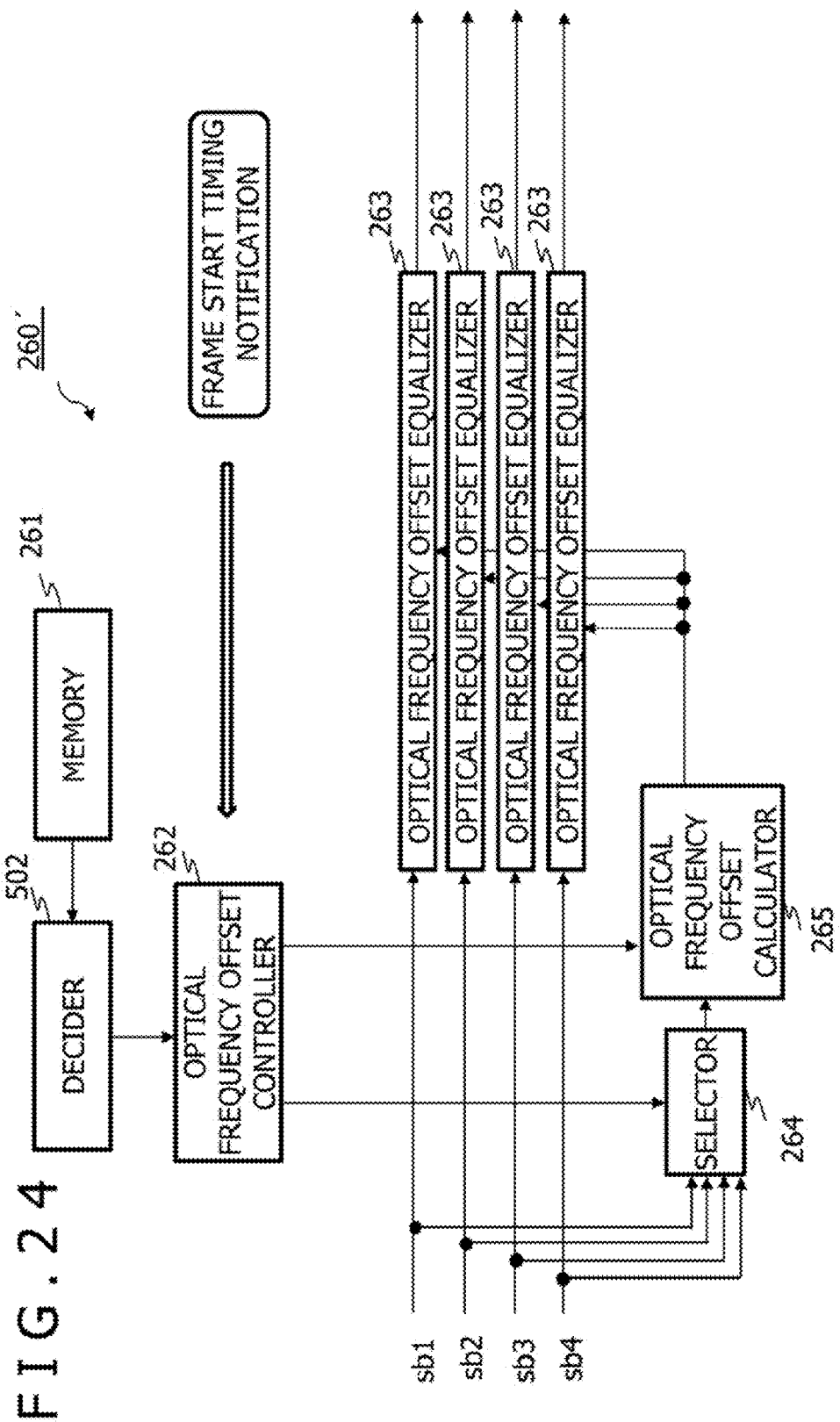
F I G. 2 4

TRANSMISSION APPARATUS, RECEPTION APPARATUS AND MODULATION METHOD

CROSS-REFERENCE TO RELATED APPLICATION

This application is based upon and claims the benefit of priority of the prior Japanese Patent Application No. 2015-221480, filed on Nov. 11, 2015, the entire contents of which are incorporated herein by reference.

FIELD

The embodiments discussed herein are related to optical communication.

BACKGROUND

In optical communication, it is demanded to transmit a large amount of data over a long distance. As a method for transmitting light over a long distance, a subcarrier multiplexing transmission system is known. Further, a method for raising the frequency utilization efficiency in order to transmit a large amount of data is known. For example, as a method for raising the frequency utilization efficiency, a hybrid transmission method that uses a plurality of modulation formats is known.

Also a frequency division duplex technology or a like technology is known in which different modulation formats (hybrid modulation) are used for different subcarriers of a subcarrier multiplexing transmission system and frequencies different between transmission and reception apparatuses are allocated to perform full-duplex communication.

Data of transmission distances in the modulation formats of, for example, quadrature phase shift keying (QPSK), 8 quadrature-amplitude-modulation (QAM) and 16 QAM are known. It is known that the transmission capacity is increased by changing the modulation format between QPSK and 8 QAM or 16 QAM according to the transmission distance (refer, for example, to X. Zhou et al., "High Spectral Efficiency 400 Gb/s Transmission Using PDM Time-Domain Hybrid 32-64 QAM and Training-Assisted Carrier Recovery," JOURNAL OF LIGHTWAVE TECHNOLOGY, VOL. 31, NO. 7, April, 2013).

Data in which an efficiency when data are transmitted using a single subcarrier having a great transmission capacity and an efficiency when data are transmitted using a plurality of subcarriers each having a small transmission capacity are compared with each other are known (refer, for example, to T. Oyama, H. Nakashima, T. Hoshida, T. Tanimura, Y. Akiyama, Z. Tao and J. C. Rasmussen, "Complexity Reduction of Perturbation based Nonlinear Compensator by Sub band Processing," OFC, paper Th3D. 7, 2015).

SUMMARY

According to an aspect of the invention, a transmission apparatus is configured to transmit an optical signal by using a plurality of subcarriers, the transmission apparatus includes: a plurality of modulators, a modulator of the plurality of modulators configured to be capable of changing a modulation format corresponding to a subcarrier of the plurality of subcarriers; a controller configured to control the modulation format for the modulator so as to use a first modulation format and a second modulation format for two or more subcarriers among the plurality of subcarriers and include subcarriers that are different in at least one of a first timing and a second timing of the first modulation format; and a multiplexer configured to multiplex signals modulated by the plurality of modulators.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a view illustrating an example of transmission data to be transmitted by the transmission apparatus according to the first embodiment;

FIG. 22 is a block diagram depicting an example of a configuration of an adaptive equalizer according to the second embodiment;

FIG. 24 is a block diagram depicting an example of a configuration of an optical frequency offset compensator according to the second embodiment;

DESCRIPTION OF EMBODIMENTS

In the subcarrier multiplexing transmission, the transmission quality does not become uniform between subcarriers because of wavelength dependency of an optical filter and a wavelength selection switch, a polarization mode dispersion, polarization-dependent loss, an inter-channel nonlinear effect and so forth.

The embodiments relate to an optical transmission and reception system that combines a subcarrier multiplexing transmission system and a hybrid modulation format. In the following, embodiments of the technology in the optical transmission and reception system are described in which, when an optical frequency offset or the like is to be calculated, placement of symbols is optimized to suppress increase of the circuit scale and the transmission quality is uniformized as far as possible between different subcarriers in the subcarrier multiplexing transmission system.

First Embodiment

Figure 1:
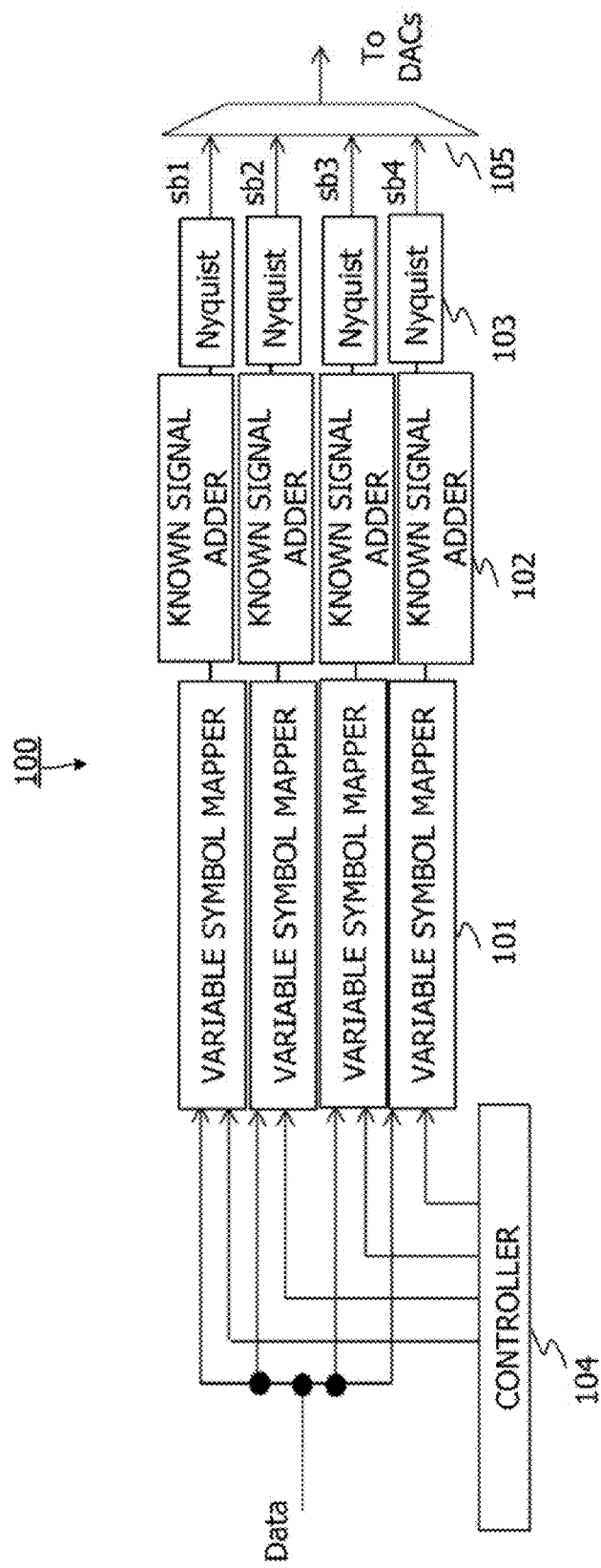
FIG. 1 is a block diagram depicting an example of a configuration of a transmission apparatus according to a first embodiment.

FIG. 1 is a block diagram depicting an example of a configuration of a transmission apparatus according to a first embodiment. A transmission apparatus 100 according to the present embodiment includes a variable symbol mapper 101, an known signal adder 102, a Nyquist 103 and a controller 104 for each subcarrier and further includes a multiplexer 105. In the example of the transmission apparatus 100, optical communication is performed using four subcarriers.

The variable symbol mappers 101 function as, for example, modulators which modulate a transmission signal into a signal of a modulation format individually corresponding to the subcarriers. The controller 104 functions as, for example, a controller which controls the modulation formats of the variable symbol mappers 101. The Nyquist circuits (Nyquist) 103 transmit Nyquist pulses. The known signal adders 102 add known signals for deciding symbols of modulation formats, for example QPSK and 8 QAM of the present embodiment, to transmission data. The multiplexer 105 functions as, for example, a multiplexer which multiplexes signals modulated by the plurality of variable symbol mappers 101 and transmits the multiplexed transmission data to the reception apparatus side.

At the reception apparatus side, data of two symbols are used to calculate an optical frequency offset value (hereinafter described). Since the difference between an angle of a reception signal and an angle of a result of a hard decision is utilized, a symbol having a lower multilevel degree has a broader correction range and a higher noise resistance. Therefore, the transmission apparatus 100 transmits data such that a symbol of a modulation format of a lower multilevel degree is included in each subcarrier (within one period). Where a plurality of modulation formats are used, the transmission apparatus 100 transmits data such that a symbol of a modulation format that has the lowest multilevel degree from among the plurality of modulation formats is included at least in each subcarrier (within one period).

FIG. 2 is a view illustrating an example of transmission data to be transmitted by the transmission apparatus according to the first embodiment. The transmission apparatus 100 transmits transmission data 110 to the reception apparatus using subcarriers 1 to 4. The transmission data 110 include, for example, an known signal and a plurality of symbol data in each subcarrier. Further, the transmission data 110 include a symbol of a modulation format (QPSK) of a low multilevel degree in each subcarrier at least within one period. It is to be noted that, in the transmission data 110, one period includes eight symbols.

The transmission apparatus 100 that transmits the transmission data 110 including QPSK data and 8 QAM data transmits the transmission data 110 such that, for example, two symbols of the QPSK data are transmitted successively and the subcarrier to be used for transmission of QPSK data is changed for every two symbols. In the first two symbols, QPSK data are placed in the subcarrier 1. In two succeeding symbols, QPSK data are placed in the subcarrier 2. In the fifth to sixth symbols, QPSK data are placed in the subcarrier 3. In the seventh and eighth symbols, QPSK data are placed in the subcarrier 4.

The process of successively transmitting two symbols of QPSK data and changing the subcarrier to be used for transmission of QPSK data after every two symbols to transmit data is controlled by the controller 104. The controller 104 may use first and second modulation formats for two or more ones of a plurality of subcarriers. Further, the controller 104 controls the modulation format such that the subcarriers include subcarriers that are different in at least one of a timing of the first symbol and a timing of the second symbol from between two successive symbols for which the first modulation format (for example, QPSK) is used.

If symbols of a modulation format of a low multilevel degree are placed in different subcarriers within one period in this manner, then data to be used for calculation of an optical frequency offset value or the like at the reception apparatus side can be such as represented by used data 111. An optical frequency offset value is calculated at a timing of once from between twice using QPSK data at all timings of the used data 111. Further, correction of phase rotation can be performed using the same optical frequency offset value for all subcarriers. The transmission quality can be uniformized as far as possible among all subcarriers in the subcarrier multiplexing transmission system.

Figure 3:
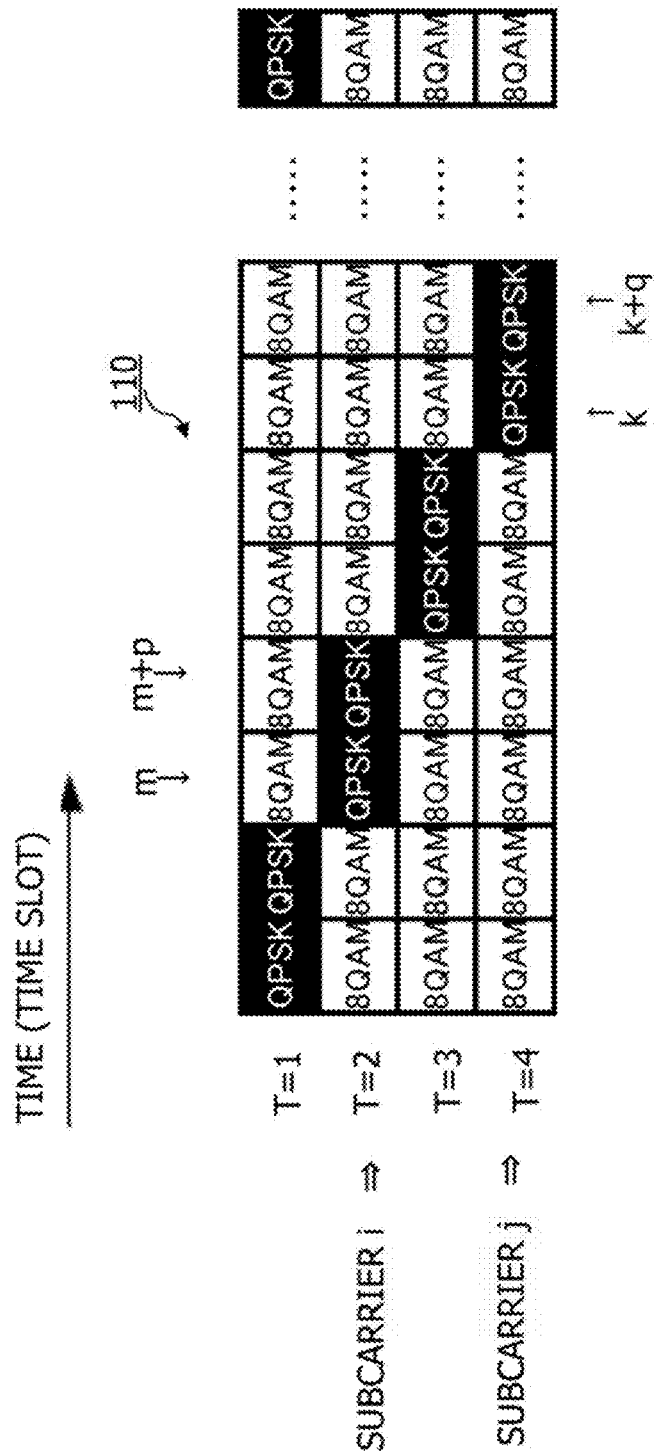
FIG. 3 is a view illustrating an example of a configuration condition of transmission data according to the first embodiment.

FIG. 3 is a view illustrating an example of a configuration condition of transmission data according to the first embodiment. The number of subcarriers in the transmission apparatus 100 is represented by T. The number of symbols in one period of the transmission data 110 is represented by n.

The transmission apparatus 100 places a symbol of the modulation format of the low multilevel degree to the m-th symbol of the subcarrier i in the r-th period. In the example of the present embodiment, the m-th symbol of the subcarrier i in the r-th period is represented by S(i, m+n*r). The third symbol of the subcarrier 2 can be represented as S(2, 3+n*r). The controller 104 places a same symbol in the third and succeeding symbols of the subcarrier 2. If it is assumed that this is the m+p-th symbol of the subcarrier i, then the symbol is represented by S(i, m+p+n*r).

The transmission apparatus 100 places a symbol of the modulation format of the low multilevel degree in the k-th symbol of a different subcarrier j. In the example of the present embodiment, the k-th symbol of the subcarrier j in the r-th period is represented by S(j, k+n*r). The seventh symbol of the subcarrier 4 can be represented as S(4, 7+n*r). The controller 104 places a same symbol in the seventh and succeeding symbols of the subcarrier 4. If it is assumed that this is the k-+q-th symbol of the subcarrier j, then the symbol can be represented as S(j, k+q+n*r).

The configuration condition for transmission data in the first embodiment is such as follows. At least one set of S(i, m+n*r) and S(i, m+p+n*r) are included in at least one subcarrier (in one period) from among a plurality of subcarriers. Where a plurality of sets of S(i, m+n*r) and S(i, m+p+n*r) are included, all values of p are equal. In a plurality of subcarriers (in one period), S(i, m+n*r) and S(j, k+n*r) exist. It is to be noted that i and j are values different from each other. The values of m and k are different from each other, or else the values of p and q are different from each other. It is to be noted that p and q may not be equal to 1.

The controller 104 places a set of S(i, m+n*r) and S(i, m+p+n*r) of symbols for which the modulation format of the low multilevel degree is used in the subcarrier i. The controller 104 places a set of S(j, k+n*r) and S(j, k+q+n*r) of symbols for which the modulation format of a low multilevel degree is used in the subcarrier j. If at least one of timings of S(i, m+n*r) and S(i, m+p+n*r) is different from one of timings of S(j, k+n*r) and S(j, k+q+n*r), then the configuration condition for transmission data can be satisfied.

Figure 4A:
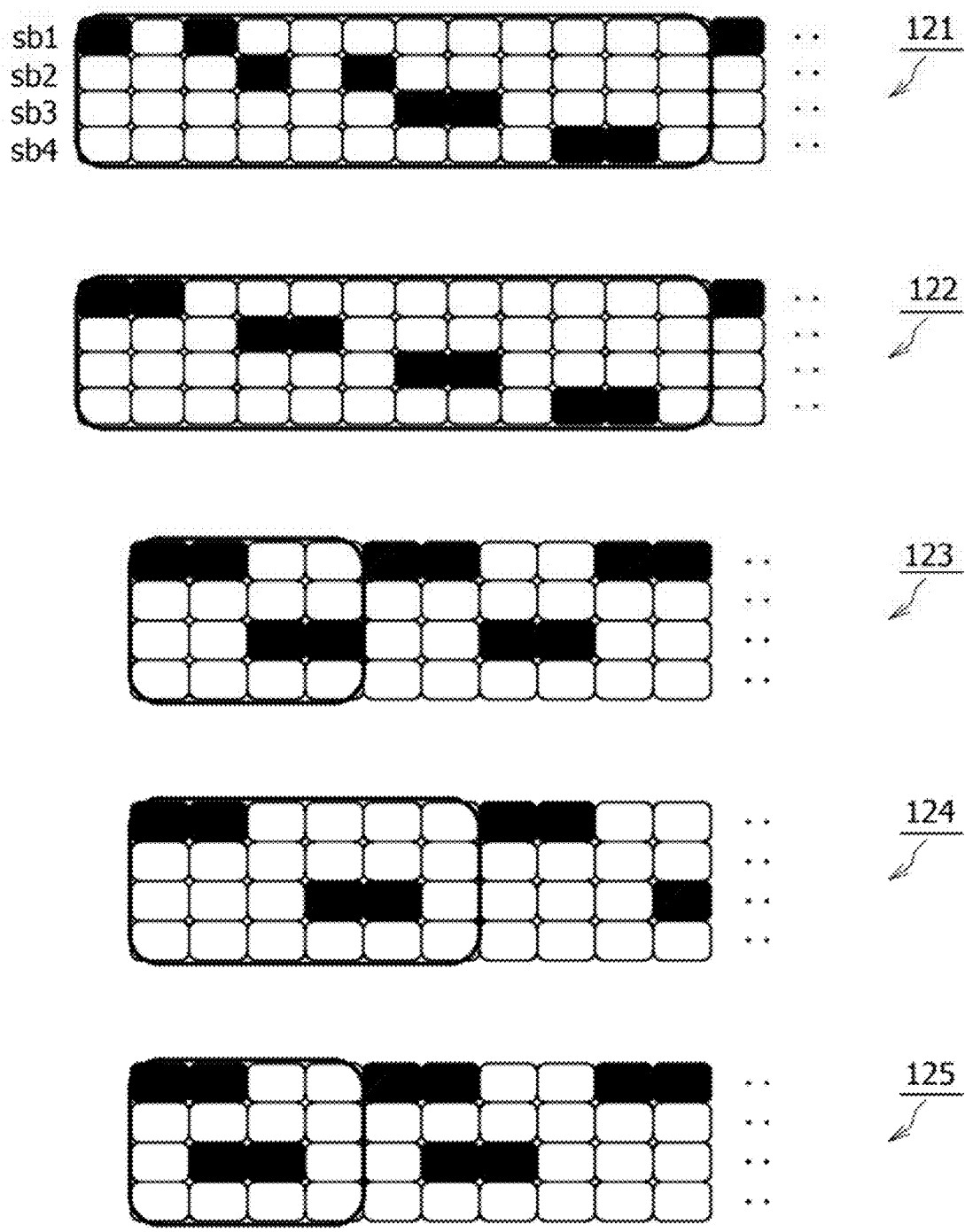
FIGS. 4A and 4B are views illustrating examples of symbol placement of transmission data to be transmitted by the transmission apparatus according to the first embodiment.
Figure 4B:
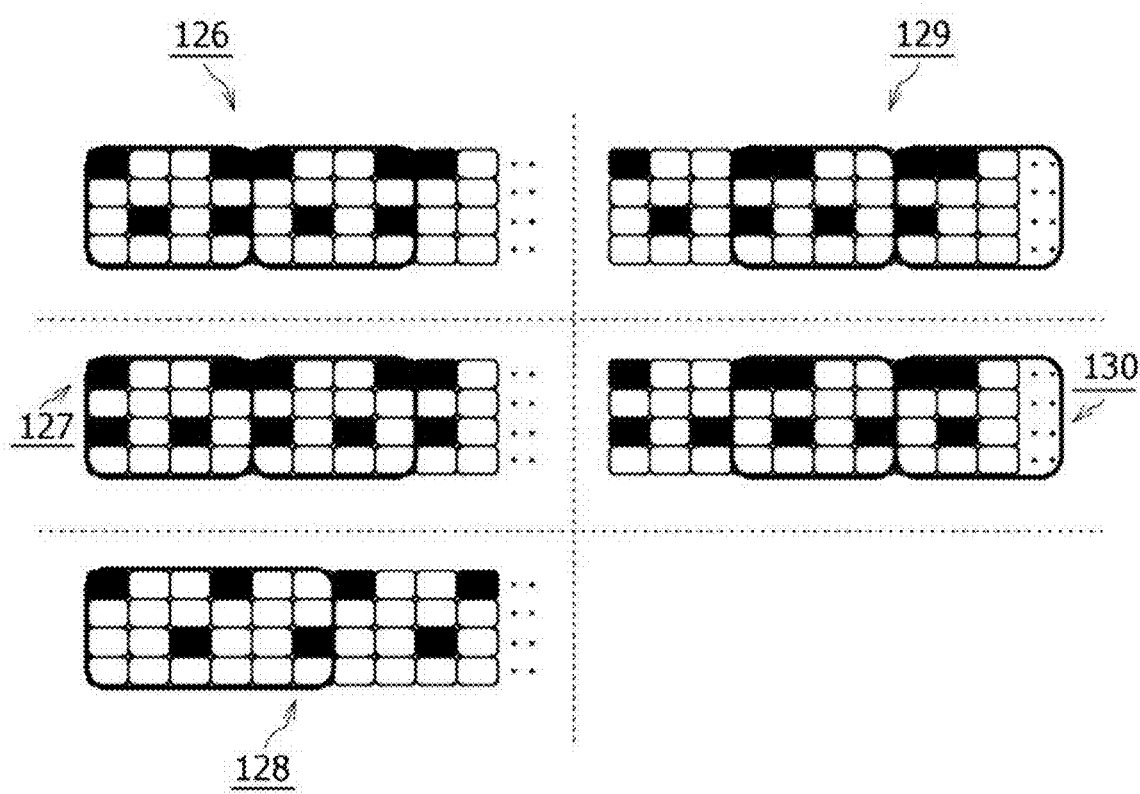

FIGS. 4A and 4B are views illustrating examples of symbol placement of transmission data to be transmitted by the transmission apparatus according to the first embodiment. In FIGS. 4A and 4B, a symbol for which the modulation format of the low multilevel degree is used is represented in black. A set of symbols for which the modulation format of the low multilevel degree is used may not appear successively as in a placement example 121. In the placement example 121, 2 is set as the value of p in the subcarriers 1 (sb1) and 2 (sb2). One symbol is placed between S(i, m+n*r) and S(i, m+p+n*r). A set of symbols for which the modulation format of the low multilevel degree is used may not exist in any sub-channel at some timing as in a placement example 122.

In a placement example 123, none of the set of S(i, m+n*r) and S(i, m+p+n*r) and the set of S(j, k+n*r) and S(j, k+q+n*r) is placed in some sub-channel. Where the symbol number n within one period is small, a sub-channel in which a set of symbols for which the modulation format of the low multilevel degree is used is not placed may exist as in the placement example 123. A placement example 124 is an example in a case in which a sub-channel in which a set of symbols for which the modulation format of the low multilevel degree is used is not placed exists and there is a timing at which the set of symbols are not placed.

In a placement example 125, sets of symbols for which the modulation format of the low multilevel degree is used including the set of S(1, 1) and S(1, 2) and the set of S(3, 2) and S(3, 3) are placed. In the placement example 125, symbols for which the modulation format of the low multilevel degree is used are placed in the subcarriers 1 and 3 at the timings of the second symbols (timings of S(1, 2) and S(3, 2)). Since the timings of at least S(1, 1) and S(3, 3) are different from each other, the placement example 125 is an example of transmission data that satisfy the configuration condition for transmission data.

In a placement example 126, sets of symbols for which the modulation format of the low multilevel degree is used including the set of S(1, 1) and S(1, 4) and the set of S(3, 2) and S(3, 4) are placed. In the placement example 126, symbols for which the modulation format of the low multilevel degree is used are placed in the subcarriers 1 and 3 at the timings of the fourth symbols (timings of S(1, 4) and S(3, 4)). Since the timings of at least S(1, 1) and S(3, 2) are different from each other, the placement example 126 is an example of transmission data that satisfy the configuration condition for transmission data.

In a placement example 127, sets of symbols for which the modulation format of the low multilevel degree is used including the set of S(1, 1) and S(1, 4) and the set of S(3, 1) and S(3, 3) are placed. In the placement example 127, symbols for which the modulation format of the low multilevel degree is used are placed in the subcarriers 1 and 3 at the timings of the first symbols (timings of S(1, 1) and S(3, 1)). Since the timings of at least S(1, 4) and S(3, 3) are different from each other, the placement example 127 is an example of transmission data that satisfy the configuration condition for transmission data.

In a placement example 128, sets of symbols for which the modulation format of the low multilevel degree is used including the set of S(1, 1) and S(1, 4) and the set of S(3, 3) and S(3, 6) are placed. Since both sets include symbols having two symbols sandwiched therebetween, the placement example 128 is an example of transmission data that satisfy the configuration condition for transmission data.

In a placement example 129, sets of symbols for which the modulation format of the low multilevel degree is used including the set of S(1, 1) and S(1, 2) and the set of S(3, 1) and S(3, 3) are placed. In the placement example 129, symbols for which the modulation format of the low multilevel degree is used are placed in the subcarriers 1 and 3 at the timings of the first symbols (timings of S(1, 1) and S(3, 1)). Since the timings of at least S(1, 2) and S(3, 3) are different from each other, the placement example 129 is an example of transmission data that satisfy the configuration condition for transmission data.

In a placement example 130, sets of symbols for which the modulation format of the low multilevel degree is used including the set of S(1, 1) and S(1, 2) and the set of S(3, 2) and S(3, 4) are placed. In the placement example 130, symbols for which the modulation format of the low multilevel degree is used are placed in the subcarriers 1 and 3 at the timings of the second symbols (timings of S(1, 2) and S(3, 2)). Since the timings of at least S(1, 1) and S(3, 4) are different from each other, the placement example 130 is an example of transmission data that satisfy the configuration condition for transmission data.

Figure 5:
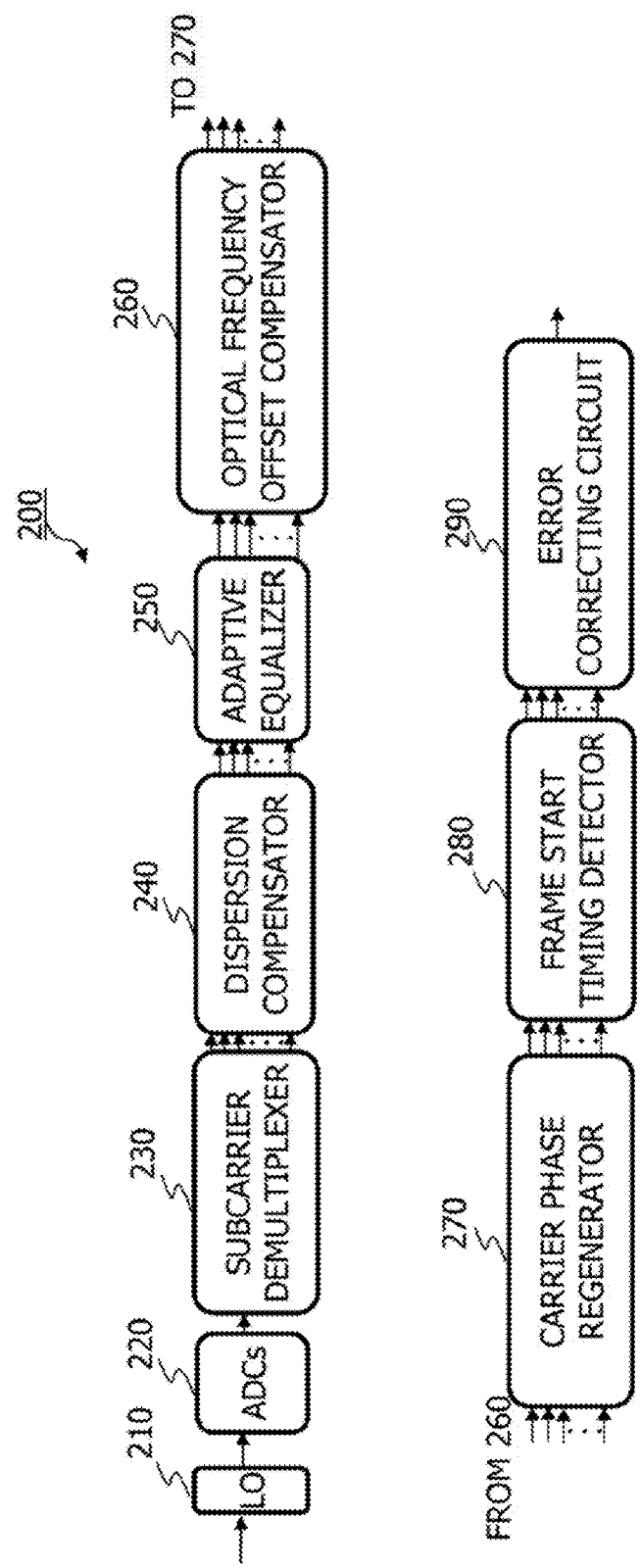
FIG. 5 is a block diagram depicting an example of a configuration of a reception apparatus according to the first embodiment.

FIG. 5 is a block diagram depicting an example of a configuration of a reception apparatus according to the first embodiment. A reception apparatus 200 includes a local oscillator (LO) 210, an analog digital converter (ADC) 220 and a subcarrier demultiplexer 230. The reception apparatus 200 further includes a dispersion compensator 240, an adaptive equalizer 250, an optical frequency offset compensator 260, a carrier phase regenerator 270, a frame start timing detector 280 and an error correcting circuit 290.

The LO 210 is an internal oscillator of the reception apparatus 200 and output a clock synchronized with a received optical signal for frequency conversion and the like. The ADC 220 converts a received optical signal from an analog signal into a digital signal. The subcarrier demultiplexer 230 demultiplexes the digital signal into signals of the subcarriers. The dispersion compensator 240 compensates for distortion caused by a transmission line. The ADC 220 converts, the subcarrier demultiplexer 230 and the dispersion compensator 240 function as, for example, a receiver.

The adaptive equalizer 250, optical frequency offset compensator 260 and carrier phase regenerator 270 are hereinafter described. The frame start timing detector 280 detects a start timing of transmission data. After a frame start timing is detected, the frame start timing detector 280 notifies the adaptive equalizer 250, optical frequency offset compensator 260 and carrier phase regenerator 270 of the detected frame start timing. The error correcting circuit 290 detects and corrects a code error of data when the code error occurs with the data.

Figure 6:
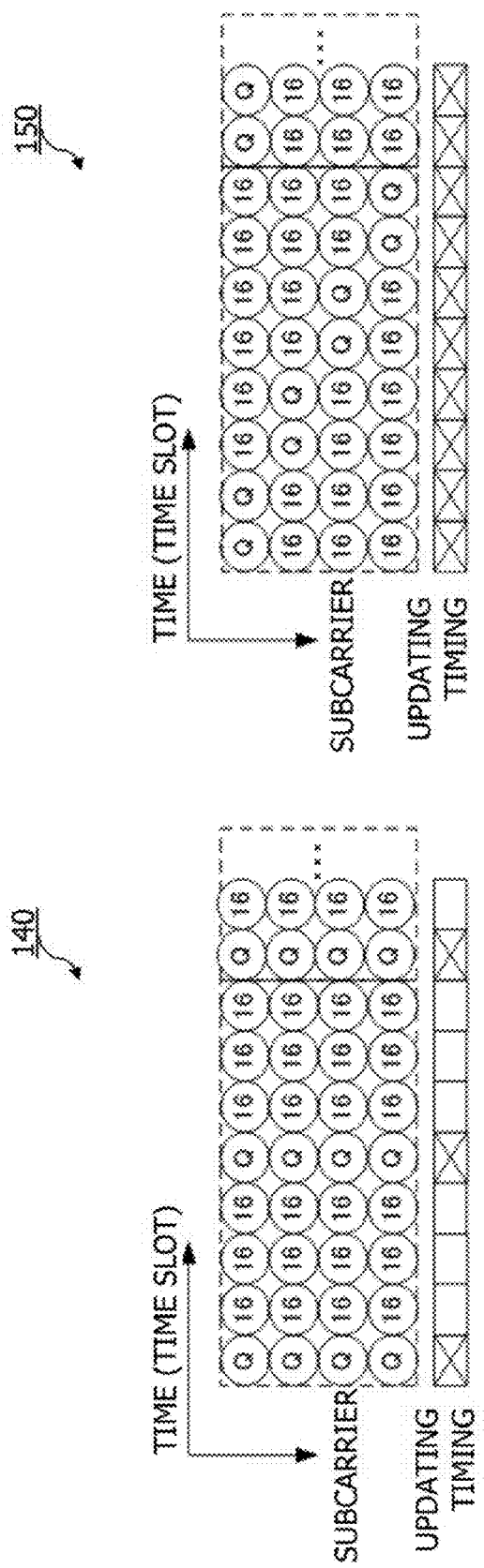
FIG. 6 is a view depicting an example (part 1) of updating timings based on transmission data.

FIG. 6 is a view depicting an example (part 1) of updating timings based on transmission data. The adaptive equalizer 250 calculates a tap coefficient on the basis of transmission data of the placement examples 121 to 130 or the like depicted in FIGS. 4A and 4B and symbols of the low multilevel degree included in the transmission data 110. Similarly, the carrier phase regenerator 270 calculates an estimation value of a carrier phase on the basis of transmission data of the placement examples 121 to 130 or the like and symbols of the low multilevel degree included in the transmission data 110. The adaptive equalizer 250 includes functions of, for example, a selector and a calculator.

In transmission data 140 and transmission data 150 of FIG. 6, QPSK and 16 QAM are indicated in abbreviated forms of "Q" and "16," respectively. Comparing QPSK and 16 QAM, symbols of QPSK are lower in multilevel degree. Here, the transmission data 140 are an example of data of a low efficiency which are not used in the embodiments.

The transmission data 140 are transmission data whose one period includes eight symbols. QPSK symbols (symbols of the low multilevel degree) are disposed at timings of the first and fifth symbols in all subcarriers. Consequently, the adaptive equalizer 250 calculates a tap coefficient at the timings of the first and fifth symbols and updates the tap coefficients to the calculated new values. The carrier phase regenerator 270 calculates an estimation value at the timings of the first and fifth symbols and updates the estimation values to the calculated new values.

The updating timing of each of a tap coefficient and an estimation value is indicated, for example, by "x." At a timing at which "x" is not indicated, updating of a tap coefficient and an estimation value is not performed.

Meanwhile, the transmission data 150 are transmission data whose one period includes eight symbols. Further, the transmission data 150 include a number of QPSK symbols equal to that of the transmission data 140 in each subcarrier. Here, the transmission data 150 are an example of data that can be used in the transmission apparatus 100 of the first embodiment. The transmission data 150 include symbols (QPSK symbols) of the low multilevel degree in a set of S(1, 1) and S(1, 2), another set of S(2, 3) and S(2, 4), a further set of S(3, 5) and S(3, 6) and a still further set of S(4, 7) and S(4, 8). The transmission data 150 include a symbol (QPSK symbol) of the low multilevel degree at all timings. Therefore, the adaptive equalizer 250 receiving the transmission data 150 can calculate and update a tap coefficient at all timings. Similarly, the carrier phase regenerator 270 receiving the transmission data 150 can calculate and update an estimation value at all timings.

In this manner, where the reception apparatus 200 receives such data as the transmission data 150, the adaptive equalizer 250 and the carrier phase regenerator 270 can update values (estimation value and tap coefficient) to be used for processing at all timings. Therefore, in comparison with an alternative case in which the transmission data 140 are received by the adaptive equalizer 250 and the carrier phase regenerator 270, the follow-up property of the estimation value and the tap coefficient can be improved. Also the updating frequency can be improved.

Figure 7:
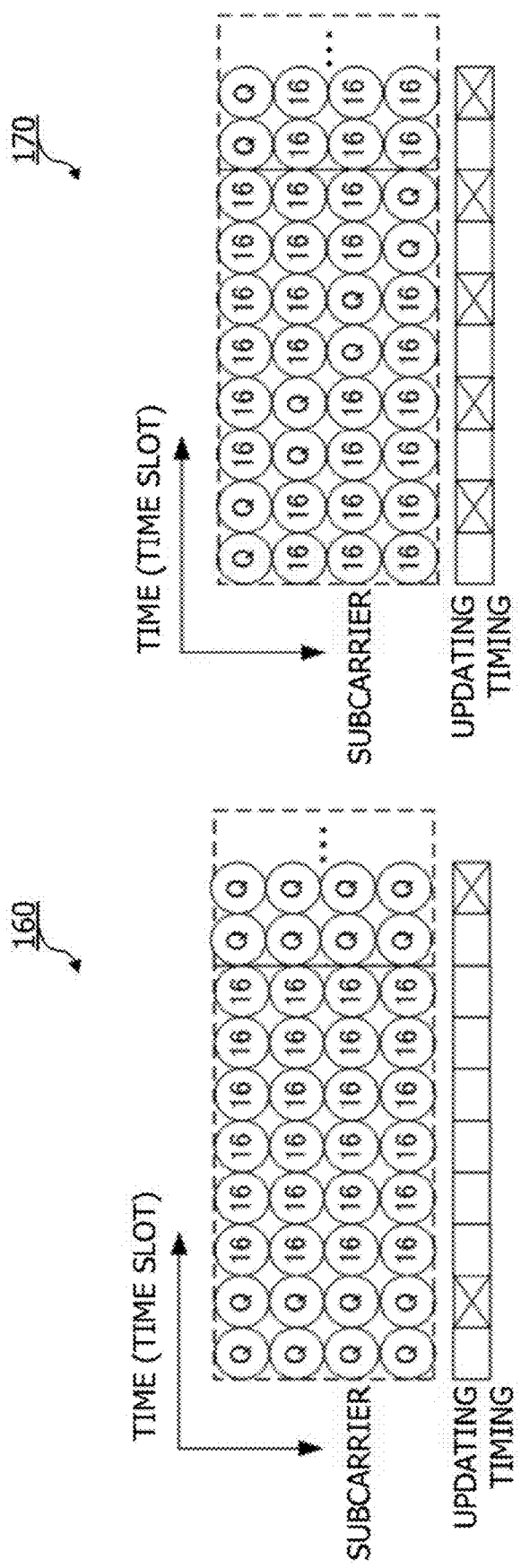
FIG. 7 is a view depicting another example (part 2) of updating timings based on transmission data.

FIG. 7 is a view depicting another example (part 2) of updating timings based on transmission data. The optical frequency offset compensator 260 calculates an optical frequency offset value on the basis of transmission data of the placement examples 121 to 130 or the like or symbols of the low multilevel degree included in the transmission data 110. The optical frequency offset value is calculated on the basis of the difference in angle between two symbols. Therefore, for example, the optical frequency offset value is calculated and updated at a timing at which two QPSK symbols are detected. The optical frequency offset compensator 260 functions as, for example, a compensator.

Transmission data 160 are transmission data whose one period includes eight symbols. Here, the transmission data 160 are an example of data of a low efficiency which are not used in the embodiments. A QPSK symbol (symbol of the low multilevel degree) is placed at timings of the first and second symbols in all subcarriers. Consequently, the optical frequency offset compensator 260 calculates and updates an optical frequency offset value using the first and second symbols. Therefore, the calculation and updating timing is the timing of the second symbol.

Meanwhile, transmission data 170 are transmission data whose one period includes eight symbols. Further, the transmission data 170 include a number of QPSK symbols equal to that of the transmission data 160 in each subcarrier. Here, the transmission data 170 are an example of data that can be used in the transmission apparatus 100 of the first embodiment. The transmission data 170 include symbols (QPSK symbols) of the low multilevel degree in a set of S(1, 1) and S(1, 2), another set of S(2, 3) and S(2, 4), a further set of S(3, 5) and S(3, 6) and a still further set of S(4, 7) and S(4, 8). The optical frequency offset compensator 260 calculates an optical frequency offset value using two QPSK symbols. Therefore, the optical frequency offset compensator 260 calculates and updates an optical frequency offset value, for example, using each of the sets of S(1, 1) and S(1, 2), S(2, 3) and S(2, 4), S(3, 5) and S(3, 6), and S(4, 7) and S(4, 8). Therefore, the updating timing of the optical frequency offset value is the timing of the latter symbol in each set.

In this manner, since the reception apparatus 200 receives such data as the transmission data 170, the optical frequency offset compensator 260 can improve the updating frequency of an optical frequency offset value in comparison with an alternative case in which the optical frequency offset compensator 260 receives the transmission data 160.

Figure 8:
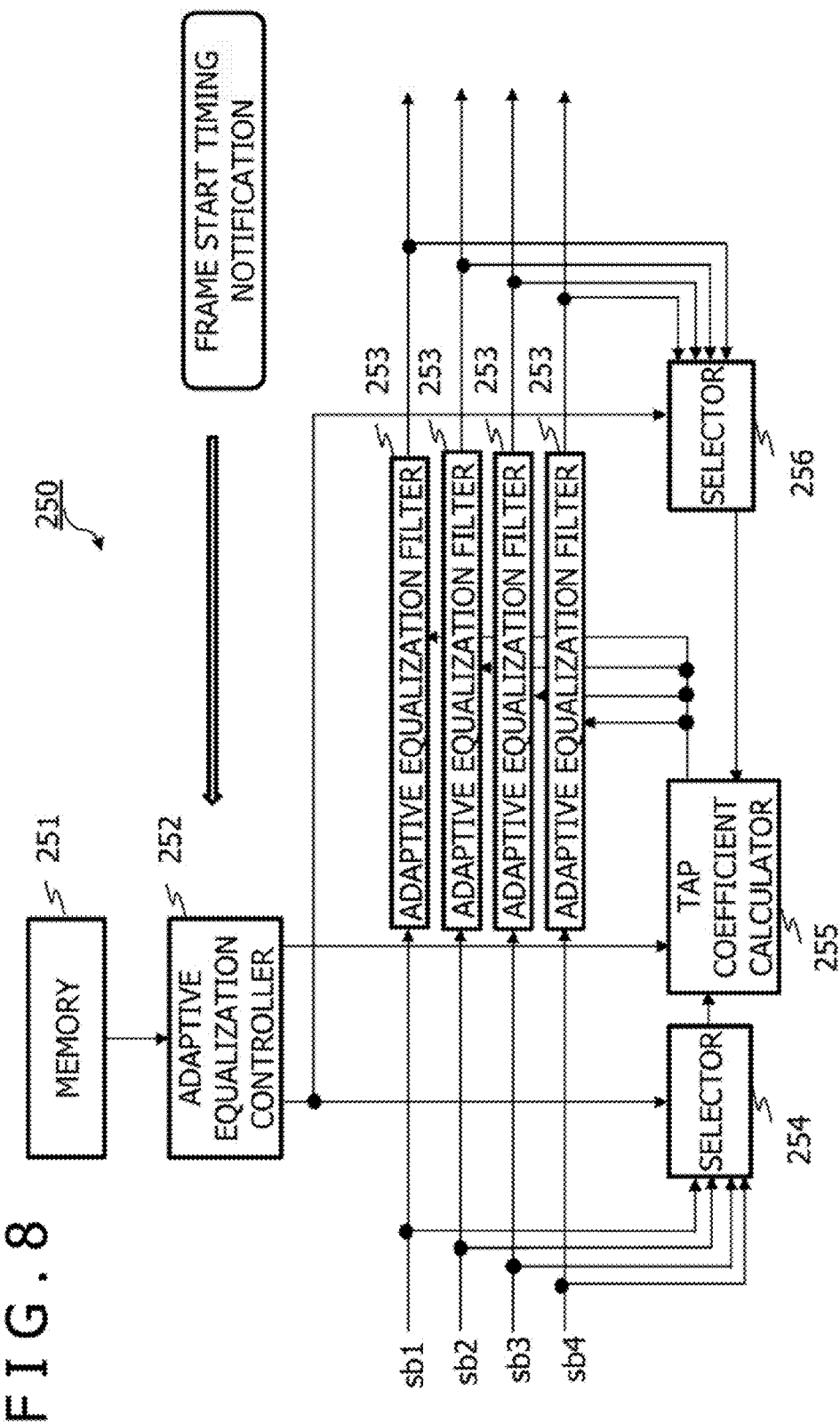
FIG. 8 is a block diagram depicting an example of a configuration of an adaptive equalizer according to the first embodiment.

FIG. 8 is a block diagram depicting an example of a configuration of an adaptive equalizer according to the first embodiment. The adaptive equalizer 250 is used to reduce inter-symbol interferences. The adaptive equalizer 250 includes a memory 251, an adaptive equalization controller 252, adaptive equalization filters 253, a selector 254, a tap coefficient calculator 255 and another selector 256. The memory 251 has stored therein information of symbols to be used for calculation of a tap coefficient. The adaptive equalization controller 252 starts processing when adaptive equalization controller 252 is notified of a frame start timing from the frame start timing detector 280. The adaptive equalization controller 252 controls the subcarrier to be selected by the selector 254 and the selector 256. Further, the adaptive equalization controller 252 controls an operation timing of the tap coefficient calculator 255. The selectors 254 and 256 function as, for example, a selector. The tap coefficient calculator 255 functions as, for example, a calculator.

Each of the adaptive equalization filters 253 is, for example, a finite impulse response (FIR) filter and removes inter-symbol interferences. The tap coefficient calculator 255 may use, for example, the constant modulus algorithm (CMA) system, and a reference document for the CMA system is given below:

Reference document: Seb J. Savory. "Digital Coherent Optical Receivers: Algorithms and Subsystems," IEEE JOURNAL OF SELECTED TOPICS IN QUANTUM ELECTRONICS, VOL. 16, No. 5, SEPTEMBER/OCTOBER, 2010

The tap coefficient calculator 255 calculates a tap coefficient using an algorithm of the CMA system, and the calculated tap coefficient is passed to all adaptive equalization filters 253. The adaptive equalization filters 253 remove inter-symbol interferences of the received transmission data on the basis of the tap coefficient. It is to be noted that the tap coefficient calculator 255 may use an algorithm, for example, of decision-directed-least mean square (DD-LMS).

Figure 9:
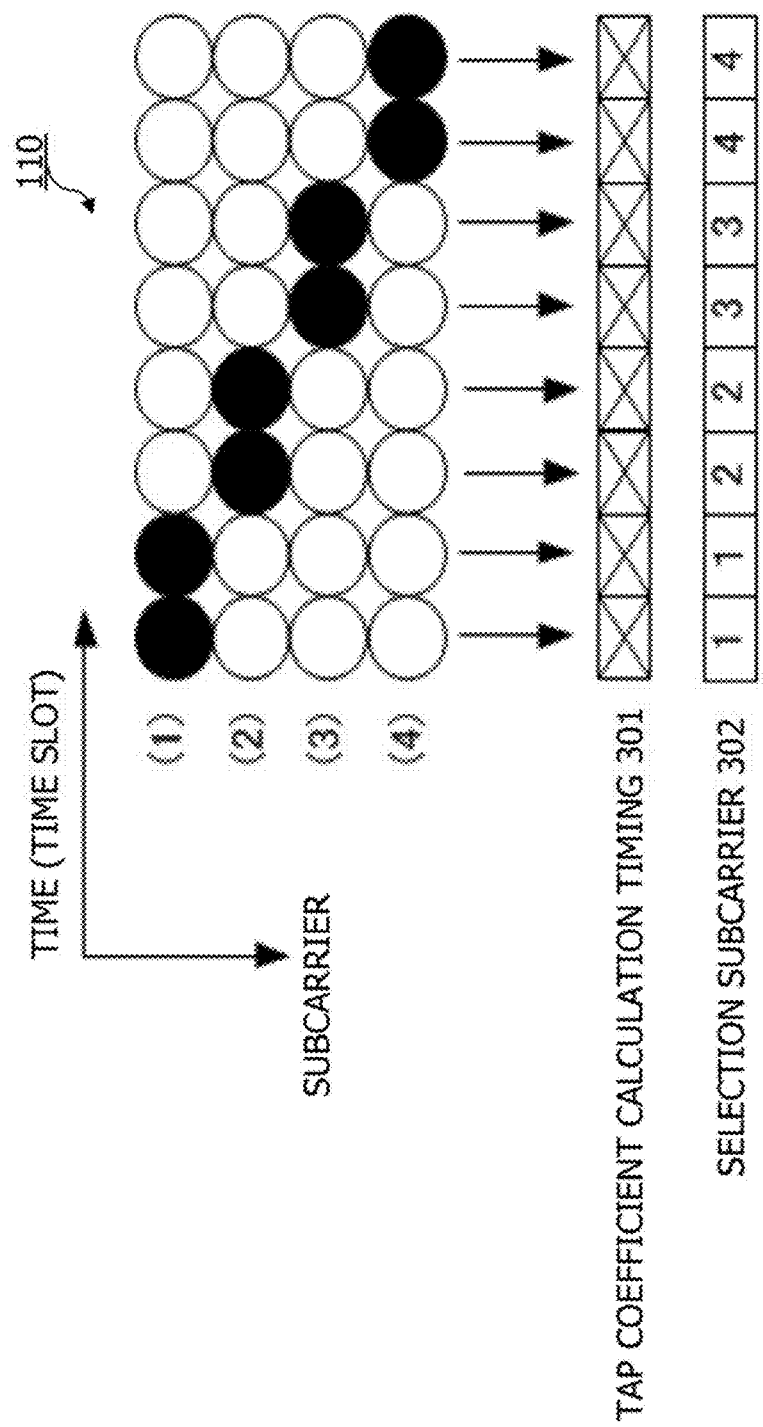
FIG. 9 is a view illustrating an example (part 1) of processing of an adaptive equalization controller according to the first embodiment.

FIG. 9 is a view illustrating an example (part 1) of processing of an adaptive equalization controller according to the first embodiment. The adaptive equalizer 250 receives transmission data 110 in which a symbol of the low multilevel degree is placed in a set of S(1, 1) and S(1, 2), another set of S(2, 3) and S(2, 4), a further set of S(3, 5) and S(3, 6) and a still further set of S(4, 7) and S(4, 8).

The adaptive equalization controller 252 controls the timing at which the tap coefficient calculator 255 is to calculate a tap coefficient on the basis of the transmission data 110. The timing at which a tap coefficient is to be calculated is a timing at which a symbol of the low multilevel degree is to be placed in the transmission data 110. Therefore, a tap coefficient calculation timing 301 holds "x," which indicates a timing at which a tap coefficient is to be calculated, at all timings.

The adaptive equalization controller 252 controls the subcarrier to be selected by the selector 254 and the selector 256 on the basis of the transmission data 110. The subcarrier to be selected is a subcarrier in which a symbol of the low multilevel degree is placed in the transmission data 110. Consequently, the adaptive equalization controller 252 controls the selector 254 and the selector 256 to successively select the subcarriers in the order of "1, 1, 2, 2, 3, 3, 4, 4" as indicated by a selection subcarrier 302.

The tap coefficient calculator 255 calculates a tap coefficient on the basis of a timing acquired from the adaptive equalization controller 252 and information of a subcarrier acquired from the selector 254 or the selector 256. The tap coefficient calculator 255 transmits the calculated tap coefficient to all adaptive equalization filters 253. The adaptive equalization filters 253 remove inter-symbol interferences of the transmission data on the basis of the tap coefficient.

Figure 10:
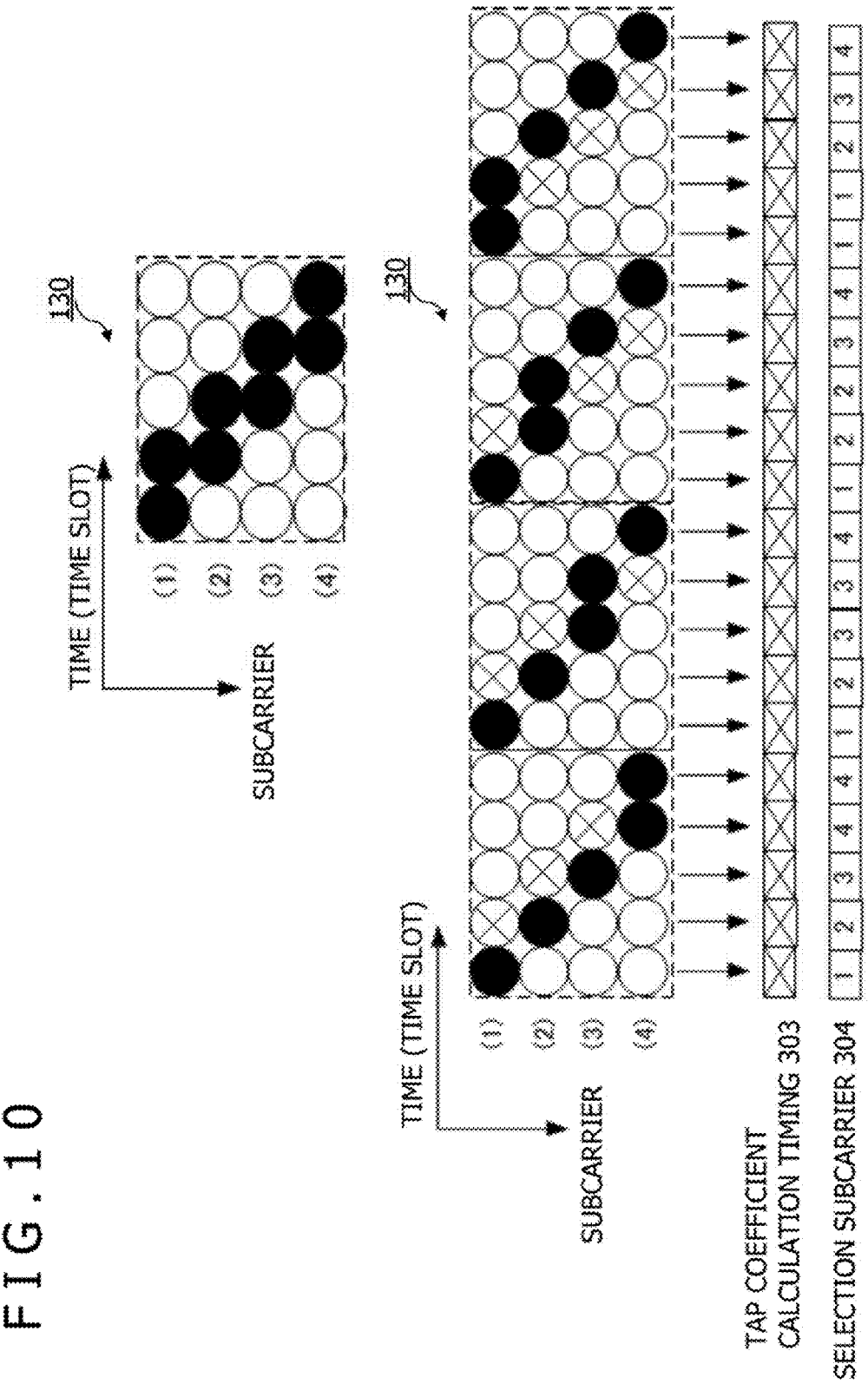
FIG. 10 is a view illustrating another example (part 2) of processing of the adaptive equalization controller according to the first embodiment.

FIG. 10 is a view illustrating another example (part 2) of processing of the adaptive equalization controller according to the first embodiment. The adaptive equalizer 250 receives transmission data 130 in which a symbol of the low multilevel degree is placed at a set of S(1, 1) and S(1, 2), another set of S(2, 2) and S(2, 3), a further set of S(3, 3) and S(3, 4) and a still further set of S(4, 4) and S(4, 5).

The adaptive equalization controller 252 controls the timing at which a tap coefficient is to be calculated by the tap coefficient calculator 255 on the basis of the transmission data 130. The timing at which a tap coefficient is to be calculated is a timing at which a symbol of the low multilevel degree is placed in the transmission data 130.

The adaptive equalization controller 252 controls the subcarrier to be selected by the selector 254 and the selector 256 on the basis of the transmission data 130. In the transmission data 130, symbols of the low multilevel degree are placed at the same timing at a location of two subcarriers. Where symbols of the low multilevel degree are placed at the same timing at a location of two subcarriers, the adaptive equalization controller 252 selects one of the subcarriers. Here, the adaptive equalization controller 252 controls the selection such that the number of symbols to be used for calculation of a tap coefficient becomes uniform as far as possible among the subcarriers. Consequently, the adaptive equalization controller 252 successively selects the subcarriers such that the subcarriers "1, 2, 3, 4, 4" are selected for the first period; the subcarriers "1, 2, 3, 3, 4" are selected for the second period; the subcarriers "1, 2, 2, 3, 4" are selected for the third period; and the subcarriers "1, 1, 2, 3, 4" are selected for the fourth period as indicated by a selection subcarrier 304. Consequently, the adaptive equalization controller 252 can select the symbols each by five times in each subcarrier in four periods. It is to be noted that, in FIG. 10, a symbol that is not selected in the transmission data 130 is indicated by "x."

The tap coefficient calculator 255 calculates a tap coefficient on the basis of a timing acquired from the adaptive equalization controller 252 and information of the subcarrier acquired from the selector 254 or the selector 256. The tap coefficient calculator 255 transmits the calculated tap coefficient to all adaptive equalization filters 253. The adaptive equalization filters 253 remove inter-symbol interferences of the transmission data on the basis of the tap coefficient.

Figure 11:
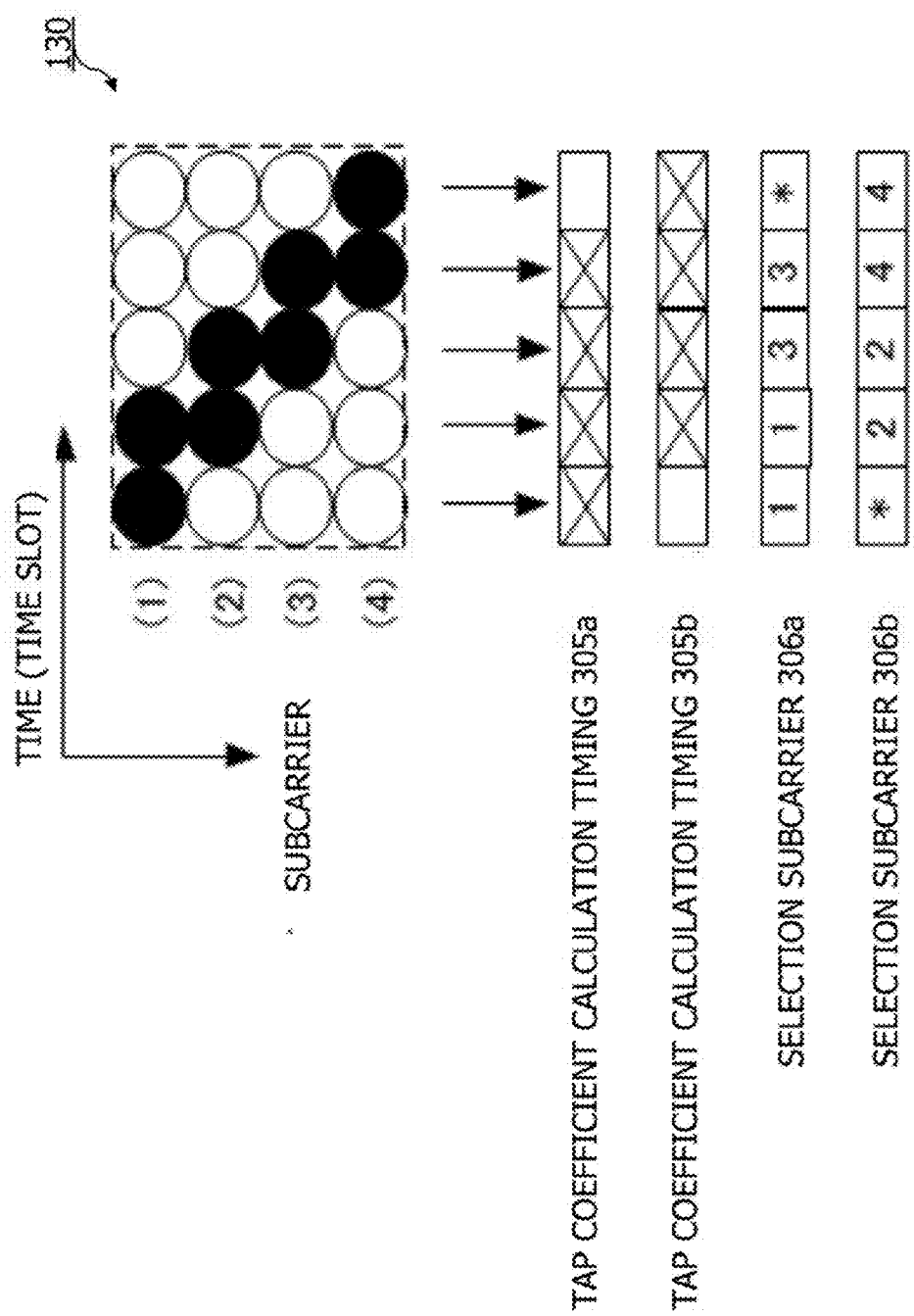
FIG. 11 is a view illustrating a further example (part 3) of processing of the adaptive equalization controller according to the first embodiment.

FIG. 11 is a view illustrating a further example (part 3) of processing of the adaptive equalization controller according to the first embodiment. The adaptive equalization controller 252 of FIG. 10 controls a tap coefficient calculation timing 303 and the selection subcarrier 304 on the basis of one symbol at each timing of the transmission data 130. FIG. 11 illustrates an example in which the adaptive equalization controller 252 does not select, even where symbols are placed at the same timing at a location of two subcarriers, one of the symbols but uses both symbols (subcarriers).

The adaptive equalization controller 252 controls the timing at which a tap coefficient is to be calculated by the tap coefficient calculator 255 on the basis of the transmission data 130. The timing at which a tap coefficient is to be calculated is a timing at which a symbol of the low multilevel degree is to be placed in the transmission data 130. A tap coefficient calculation timing 305a is a timing at which a symbol is to be placed in the subcarrier 1 and the subcarrier 3. Another tap coefficient calculation timing 305b is a timing at which a symbol is to be placed in the subcarrier 2 and the subcarrier 4.

The adaptive equalization controller 252 controls the subcarrier to be selected by the selector 254 and the selector 256 on the basis of the transmission data 130. The adaptive equalization controller 252 controls the selector 254 or the selector 256 to successively select the subcarriers in the order of "1, 1, 3, 3, none" as indicated by a selection subcarrier 306a (corresponding to the tap coefficient calculation timing 305a). On the other hand, the adaptive equalization controller 252 controls, for example, the selector 254 or the selector 256 to successively select the subcarriers in the order of "none, 2, 2, 4, 4" as indicated by a selection subcarrier 306b (corresponding to the tap coefficient calculation timing 305b).

The tap coefficient calculator 255 calculates a tap coefficient on the basis of the tap coefficient calculation timing 305a and the selection subcarrier 306a and further calculates a tap coefficient on the basis of the tap coefficient calculation timing 305b and the selection subcarrier 306b. Where two tap coefficients are calculated at the same timing, the tap coefficient calculator 255 calculates an average value of the two tap coefficients. The tap coefficient calculator 255 transmits the calculated tap coefficient to all adaptive equalization filters 253. The adaptive equalization filters 253 remove inter-symbol interferences of the transmission data on the basis of the tap coefficient.

Figure 12:
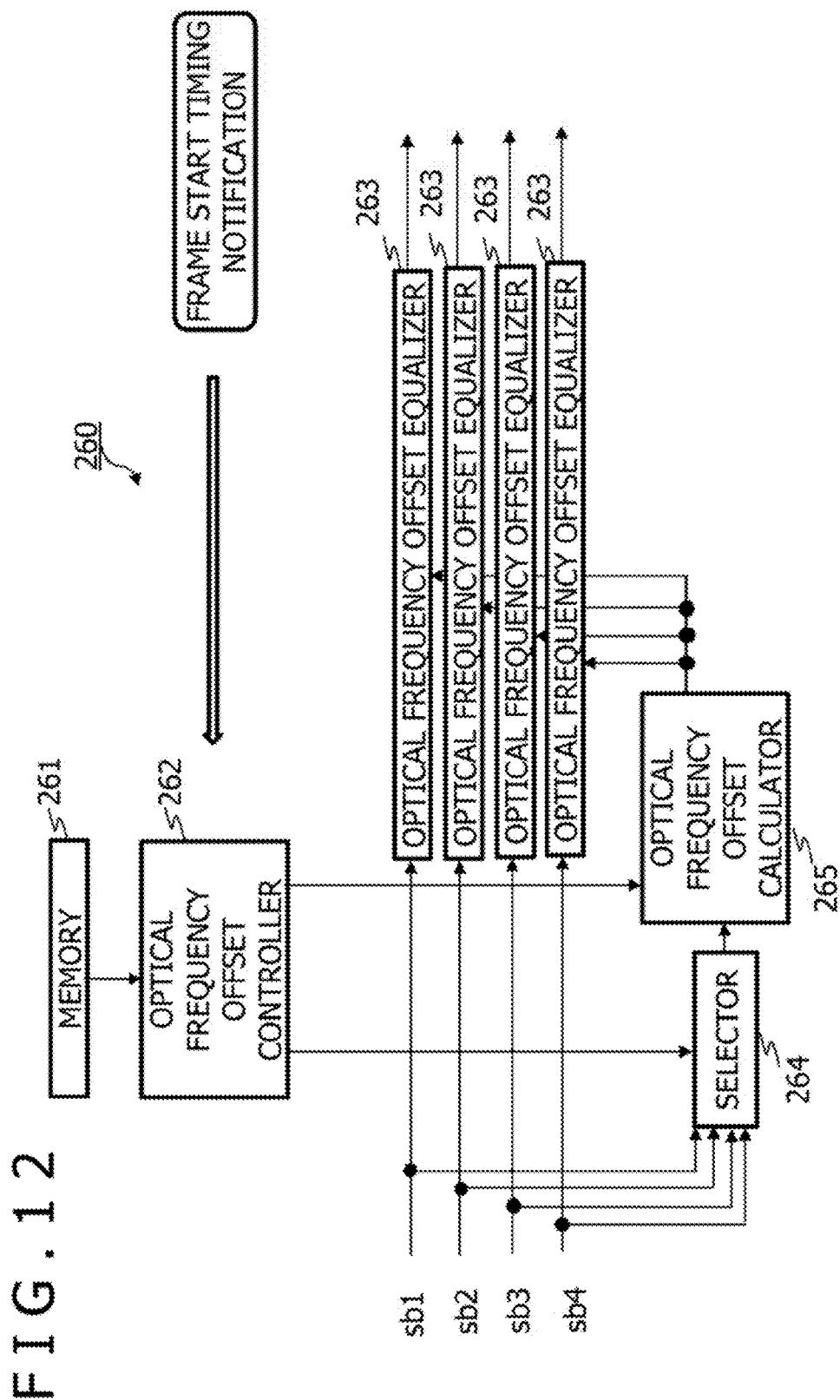
FIG. 12 is a block diagram depicting an example of a configuration of an optical frequency offset compensator according to the first embodiment.

FIG. 12 is a block diagram depicting an example of a configuration of an optical frequency offset compensator according to the first embodiment. The optical frequency offset compensator 260 calculates an optical frequency offset value using two symbols existing in the same subcarrier. The optical frequency offset compensator 260 includes a memory 261, an optical frequency offset controller 262, optical frequency offset equalizers 263, a selector 264 and an optical frequency offset calculator 265. The memory 261 has stored therein information of symbols to be used for calculation of an optical frequency offset value. The optical frequency offset controller 262 starts processing when a notification of a frame start timing is received from the frame start timing detector 280. The optical frequency offset controller 262 controls the subcarrier to be selected by the selector 264. Further, the optical frequency offset controller 262 controls the operation timing of the optical frequency offset calculator 265.

The optical frequency offset value is determined using the difference in angle between two symbols in the same subcarrier. It is to be noted that the processing of the optical frequency offset equalizers 263 and the optical frequency offset calculator 265 is described in the following reference document:

Reference document: L. Li, Z. Tao, S. Oda, T. Hoshida and J. C. Rasmussen, "Wide-range, accurate and simple digital frequency offset compensator for optical coherent receivers," OFC/NFOEC 2008, paper OWT4, February 2008.

The optical frequency offset value calculated by the optical frequency offset calculator 265 is passed to all optical frequency offset equalizers 263.

Figure 13:
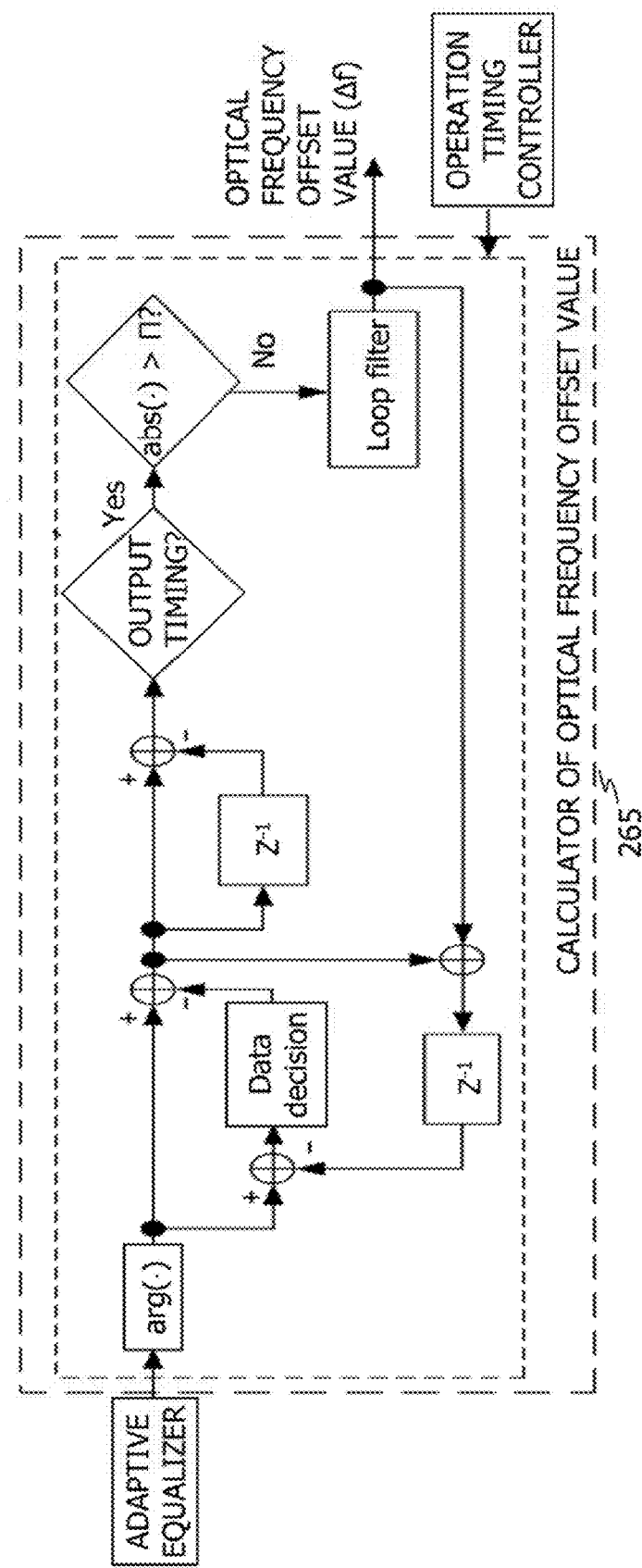
FIG. 13 is a block diagram depicting an example of a configuration of an optical frequency offset calculator according to the first embodiment.

FIG. 13 is a block diagram depicting an example of a configuration of an optical frequency offset calculator according to the first embodiment. The optical frequency offset calculator 265 is a circuit of the type called pre-decision based angle differential frequency offset estimator (PADE). The optical frequency offset calculator 265 of the PADE type can calculate a frequency offset value ($\Delta f$) by a method of performing temporary decision of a symbol and subtracting a result of the temporary decision to remove a PSK coded component.

The optical frequency offset value calculated by the optical frequency offset calculator 265 is passed to all optical frequency offset equalizers 263. The optical frequency offset equalizers 263 perform complex transformation ($\exp(-\Delta f)$) for the transmission data to remove phase rotation from the transmission data.

Figure 14:
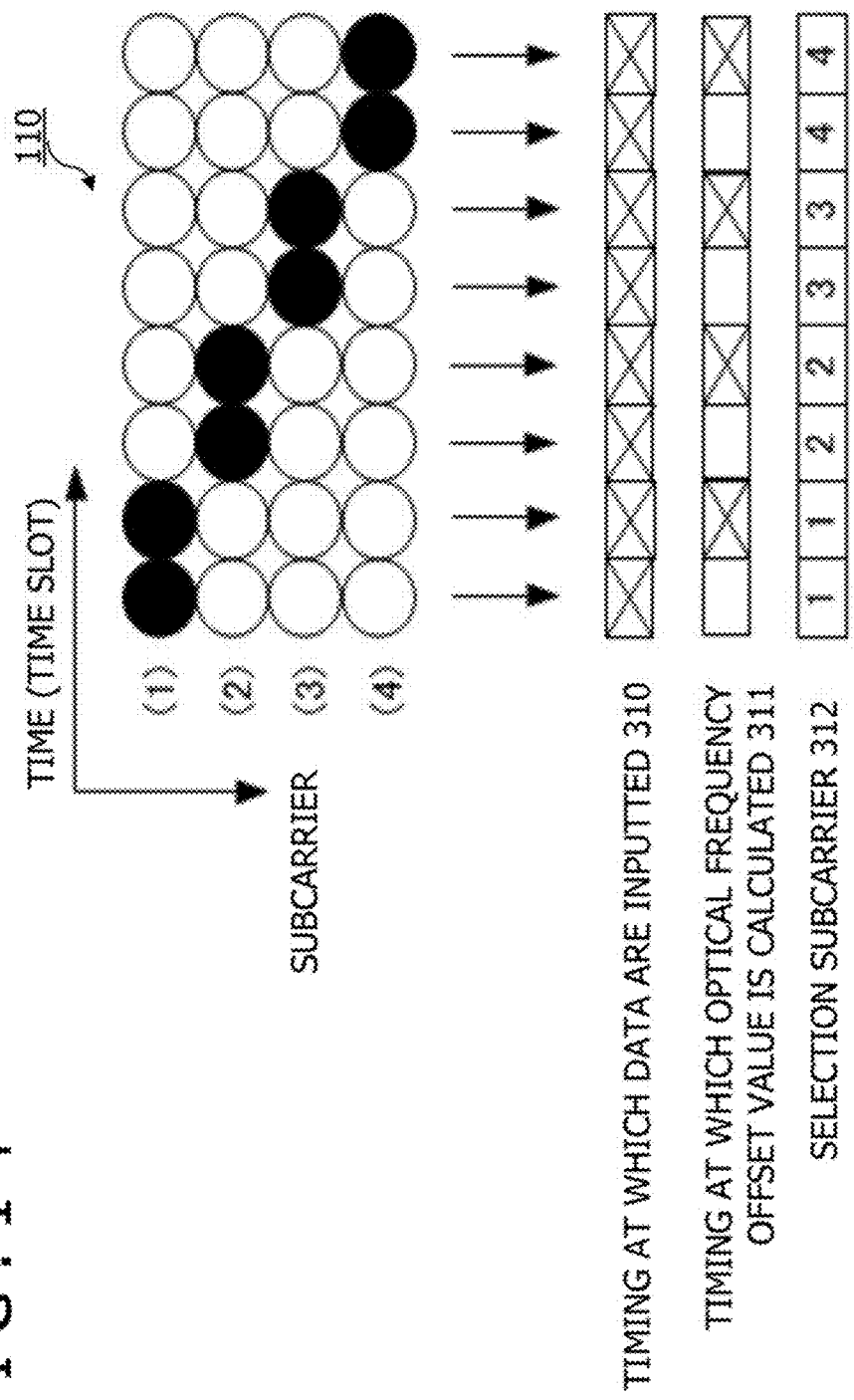
FIG. 14 is a view illustrating an example (part 1) of processing of an optical frequency offset controller according to the first embodiment.

FIG. 14 is a view illustrating an example (part 1) of processing of an optical frequency offset controller according to the first embodiment. The optical frequency offset equalizers 263 acquire transmission data 110 in which a symbol of low multilevel degree is placed, for example, in a set of S(1, 1) and S(1, 2), another set of S(2, 3) and S(2, 4), a further set of S(3, 5) and S(3, 6) and a still further set of S(4, 7) and S(4, 8).

The optical frequency offset controller 262 controls the timing at which the optical frequency offset calculator 265 is to acquire data (for example, an angle of a symbol and so forth) to be used for calculation of an optical frequency offset value on the basis of the transmission data 110. The timing at which the optical frequency offset calculator 265 is to acquire data is a timing at which a symbol of the low multilevel degree is to be placed in the transmission data 110. Consequently, the optical frequency offset calculator 265 acquires data at all timings as indicated by a timing 310 at which data are to be inputted.

The optical frequency offset controller 262 controls the timing at which an optical frequency offset value is to be calculated by the optical frequency offset calculator 265. Since the optical frequency offset uses an angular difference between two symbols or the like, every time two symbols are acquired, an optical frequency offset value can be calculated at a timing of one time (calculation timing 311).

The optical frequency offset controller 262 controls the subcarrier to be selected by the selector 264 on the basis of the transmission data 110. The subcarrier to be selected is a subcarrier in which a symbol of the low multilevel degree is placed in the transmission data 110. Consequently, the optical frequency offset controller 262 controls the selector 264 to successively select the subcarriers in the order of "1, 1, 2, 2, 3, 3, 4, 4" as indicated by a selection subcarrier 312.

The optical frequency offset calculator 265 calculates the optical frequency offset value on the basis of the timings acquired from the optical frequency offset controller 262 (timing 310 at which data are to be inputted and calculation timing 311) and information of the subcarrier acquired from the selector 264. The optical frequency offset calculator 265 transmits the calculated optical frequency offset value to all optical frequency offset equalizers 263. The optical frequency offset equalizers 263 remove phase rotation from the transmission data on the basis of the optical frequency offset value.

Figure 15:
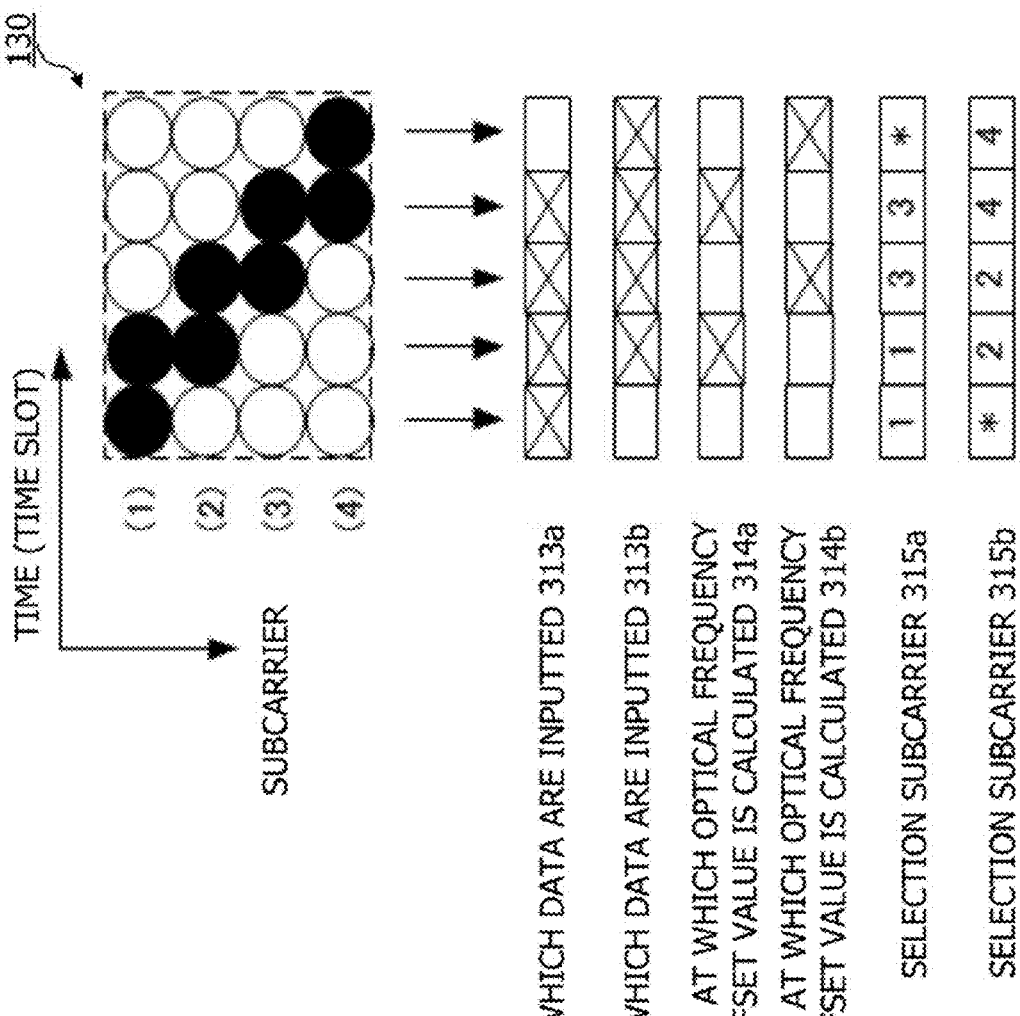
FIG. 15 is a view illustrating another example (part 2) of processing of the optical frequency offset controller according to the first embodiment.

FIG. 15 is a view illustrating another example (part 2) of processing of the optical frequency offset controller according to the first embodiment. The optical frequency offset equalizers 263 receive transmission data 130 in which a symbol of the low multilevel degree is placed, for example, in a set of S(1, 1) and S(1, 2), another set of S(2, 2) and S(2, 3), a further set of S(3, 3) and S(3, 4) and a still further set of S(4, 4) and S(4, 5).

The optical frequency offset controller 262 controls the timing at which the optical frequency offset calculator 265 is to acquire data (for example, an angle of a symbol or the like) to be used for calculation of an optical frequency offset value on the basis of the transmission data 130. The timing at which the optical frequency offset calculator 265 is to acquire data is a timing at which a symbol of the low multilevel degree is placed in the transmission data 130. A timing 313a at which data are to be inputted is a timing at which a symbol is placed in the subcarrier 1 and the subcarrier 3. A timing 313b at which data are to be inputted is a timing at which a symbol is placed in the subcarrier 2 and the subcarrier 4.

The optical frequency offset controller 262 controls the timing at which the optical frequency offset calculator 265 is to calculate an optical frequency offset value. Since the optical frequency offset uses an angular difference between two symbols or the like, every time two symbols are acquired, an optical frequency offset value can be calculated at a timing of one time. Therefore, the optical frequency offset controller 262 controls the optical frequency offset calculator 265 to calculate an optical frequency offset value at the second and fourth timings (calculation timing 314a) on the basis of the timing 313a at which data are to be inputted. The optical frequency offset controller 262 controls the optical frequency offset calculator 265 to calculate an optical frequency offset value at the third and fifth timings (calculation timing 314b) on the basis of the timing 313b at which data are to be inputted.

The optical frequency offset controller 262 controls the subcarrier to be selected by the selector 264 on the basis of the transmission data 130. The subcarrier to be selected is a subcarrier in which a symbol of the low multilevel degree is placed in the transmission data 130. The optical frequency offset controller 262 controls the selector 264 to select the subcarriers in the order of "1, 1, 3, 3, none" as indicated by a selection subcarrier 315a (corresponding to the optical frequency calculation timing 314a). The optical frequency offset controller 262 controls the selector 264 to select the subcarriers in the order of "none, 2, 2, 4, 4" as indicated by a selection subcarrier 315b (corresponding to the optical frequency calculation timing 314b).

The optical frequency offset calculator 265 calculates an optical frequency offset value on the basis of the timings (timing 313a at which data are to be inputted and calculation timing 314a) acquired from the optical frequency offset controller 262 and the information of the subcarrier acquired from the selector 264. Together with this, the optical frequency offset calculator 265 calculates an optical frequency offset value on the basis of the timings (timing 313b at which data are to be inputted and calculation timing 314b) acquired from the optical frequency offset controller 262 and the information of the subcarrier acquired from the selector 264.

The optical frequency offset calculator 265 transmits the calculated optical frequency offset value to all optical frequency offset equalizers 263. The optical frequency offset equalizers 263 remove phase rotation from the transmission data on the basis of the optical frequency offset values. Further, where two optical frequency offset values are calculated at the same timing, the optical frequency offset calculator 265 may transmit an average value of the two optical frequency offset values to all optical frequency offset equalizers 263.

Figure 16:
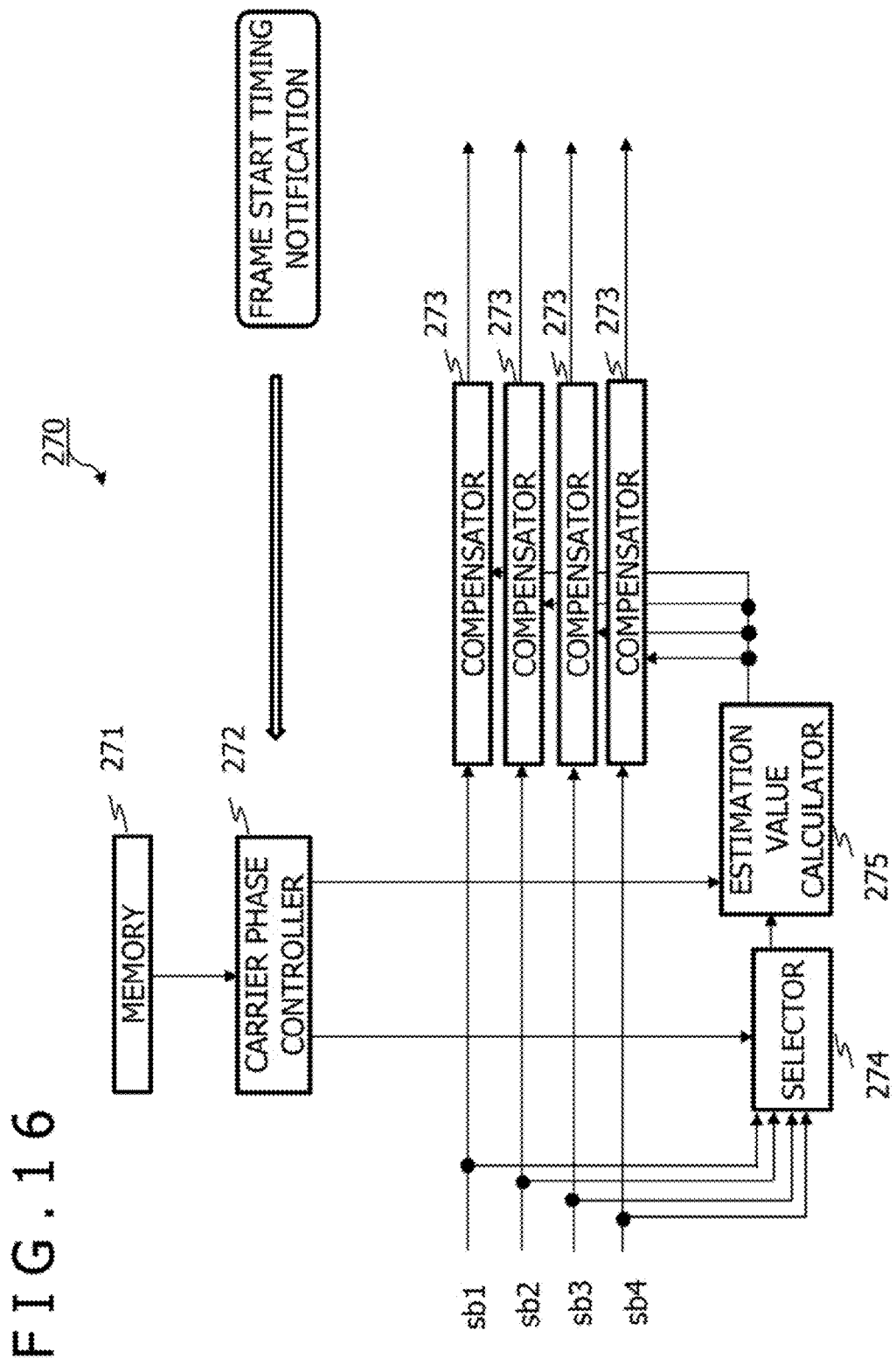
FIG. 16 is a block diagram depicting an example of a configuration of a carrier phase regenerator according to the first embodiment.

FIG. 16 is a block diagram depicting an example of a configuration of a carrier phase regenerator according to the first embodiment. The carrier phase regenerator 270 is used to regenerate the phase of the carrier. The carrier phase regenerator 270 includes a memory 271, a carrier phase controller 272, compensators 273, a selector 274 and an estimation value calculator 275. The memory 271 has stored therein information of symbols to be used for calculation of an estimation value of the carrier phase. The carrier phase controller 272 starts processing when the carrier phase controller 272 is notified of a frame start timing from the frame start timing detector 280. The carrier phase controller 272 controls the subcarrier to be selected by the selector 274. Further, the carrier phase controller 272 controls the operation timing of the estimation value calculator 275.

As the processing algorithm to be used in the estimation value calculator 275 and the compensators 273, for example, a processing algorithm disclosed in a reference document given below may be used. The value calculated by the estimation value calculator 275 is passed to all compensators 273.

Reference document: D. Ly-Gangnon, S. Tsukamoto, K. Katoh, K. Kikuchi, "Coherent Detection of Optical Quadrature Phase-Shift Keying Signals With Carrier Phase Estimation," JOURNAL OF LIGHTWAVE TECHNOLOGY, VOL. 24, NO. 1, January, 2006

Figure 17:
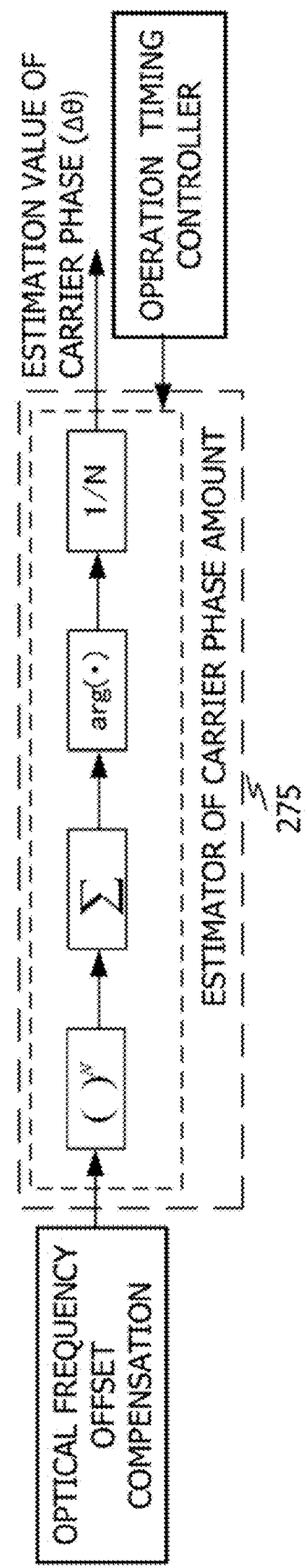
FIG. 17 is a block diagram depicting an example of a configuration of an estimation value calculator according to the first embodiment.

FIG. 17 is a block diagram depicting an example of a configuration of an estimation value calculator according to the first embodiment. The configuration of the estimation value calculator 275 of FIG. 17 is an example of a configuration that applies an accumulation method that can be applied to PSK—this circuit can calculate an estimation value of the carrier phase making use of the fact that, if a complex electric field of a PSK signal is raised to the m-th power, then the symbol information overlaps at one point on the complex plane.

Figure 18:
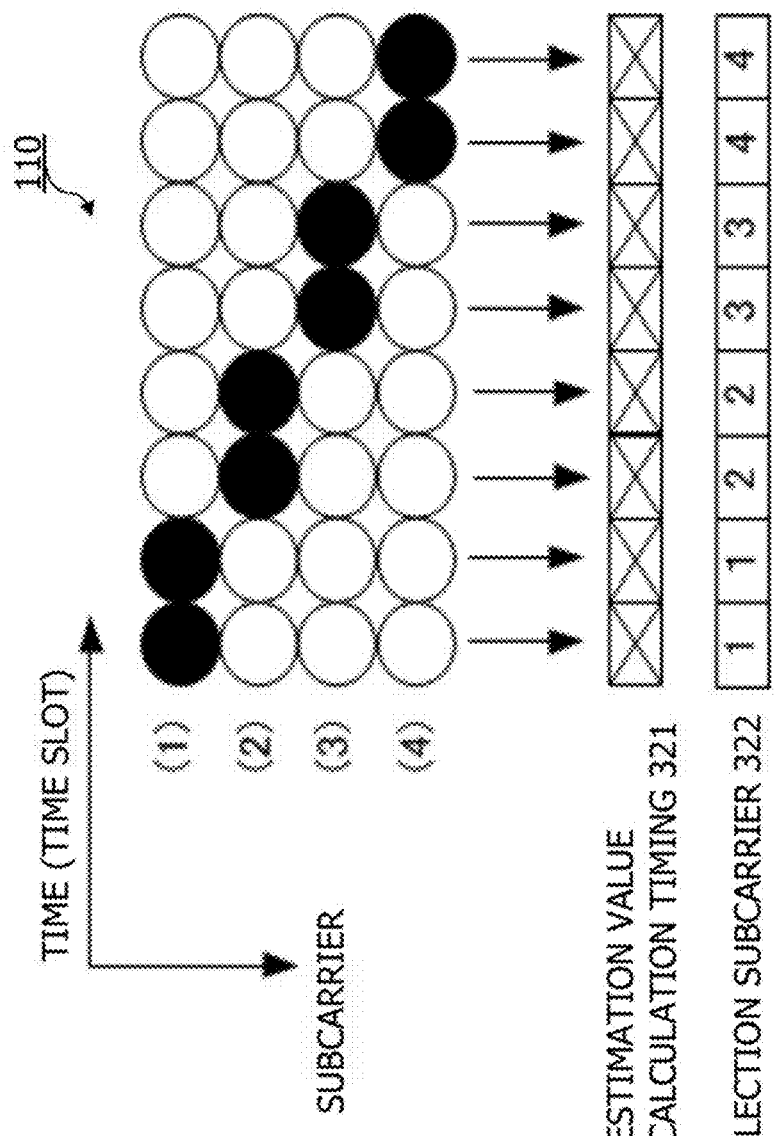
FIG. 18 is a view illustrating an example (part 1) of processing of a carrier phase controller according to the first embodiment.

FIG. 18 is a view illustrating an example (part 1) of processing of a carrier phase controller according to the first embodiment. Referring to FIG. 18, the carrier phase regenerator 270 receives transmission data 110 in which a symbol of the low multilevel degree is placed in a set of S(1, 1) and S(1, 2), another set of S(2, 3) and S(2, 4), a further set of S(3, 5) and S(3, 6) and a still further set of S(4, 7) and S(4, 8).

The carrier phase controller 272 controls the timing at which the estimation value calculator 275 is to calculate an estimation value of the carrier phase on the basis of the transmission data 110. The timing at which an estimation value is to be calculated is a timing at which a symbol of the low multilevel degree is placed in the transmission data 110.

The carrier phase controller 272 controls the subcarrier to be selected by the selector 274 on the basis of the transmission data 110. The subcarrier to be selected is a subcarrier in which a symbol of the low multilevel degree is placed in the transmission data 110. Consequently, the carrier phase controller 272 controls the selector 274 to select the subcarriers in the order of "1, 1, 2, 2, 3, 3, 4, 4" as indicated by a selection subcarrier 322.

The estimation value calculator 275 calculates an estimation value on the basis of a timing acquired from the carrier phase controller 272 and information of a subcarrier acquired from the selector 274. The estimation value calculator 275 transmits the calculated estimation value to all compensators 273. The compensators 273 compensate for the phase of the carrier on the basis of the estimation value.

Figure 19:
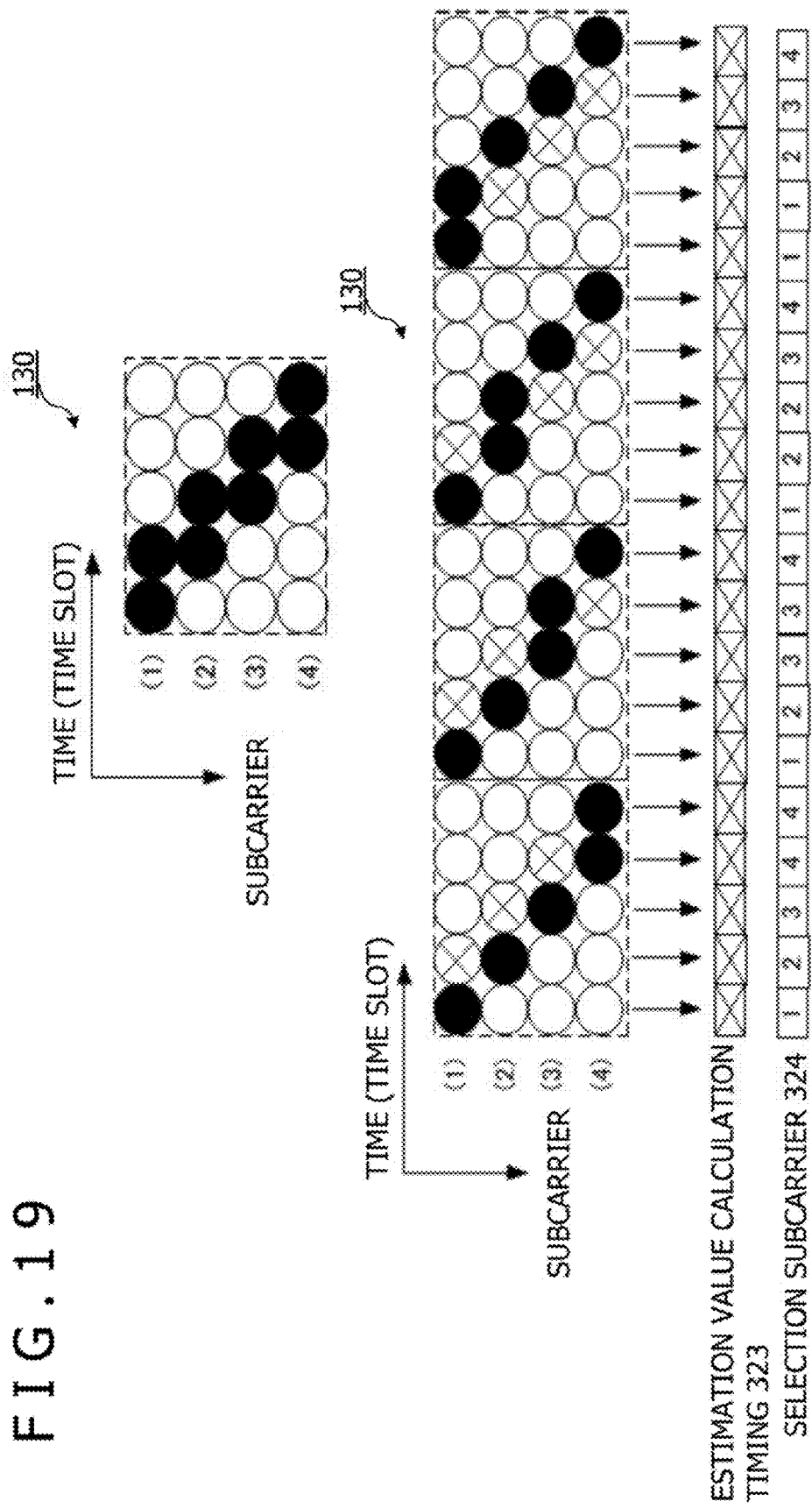
FIG. 19 is a view illustrating another example (part 2) of processing of the carrier phase controller according to the first embodiment.

FIG. 19 is a view illustrating another example (part 2) of processing of the carrier phase controller according to the first embodiment. In FIG. 19, the carrier phase regenerator 270 receives transmission data 130 in which a symbol of the low multilevel degree is placed in a set of S(1, 1) and S(1, 2), another set of S(2, 2) and S(2, 3), a further set of S(3, 3) and S(3, 4) and a still further set of S(4, 4) and S(4, 5).

The carrier phase controller 272 controls the timing at which the estimation value calculator 275 is to calculate an estimation value on the basis of the transmission data 130. The timing at which an estimation value is to be calculated is a timing at which a symbol of the multilevel degree is placed in the transmission data 130.

The carrier phase controller 272 controls the subcarrier to be selected by the selector 274 on the basis of the transmission data 130. In the transmission data 130, symbols of the low multilevel degree are placed at the same timing at a location of two subcarriers. Where symbols of the low multilevel degree are placed at the same timing at a location of two subcarriers, the carrier phase controller 272 selects one of the subcarriers. Here, the carrier phase controller 272 controls the selection such that the number of symbols to be used for calculation of an estimation value becomes uniform as far as possible among the subcarriers. Consequently, the carrier phase controller 272 selects the subcarriers such that the subcarriers "1, 2, 3, 4, 4" are selected for the first period; the subcarriers "1, 2, 3, 3, 4" are selected for the second period; the subcarriers "1, 2, 2, 3, 4" are selected for the third period; and the subcarriers "1, 1, 2, 3, 4" are selected for the fourth period as indicated by a selection subcarrier 324. Consequently, the carrier phase controller 272 can select the symbols each by five times in each subcarrier in four periods.

The estimation value calculator 275 calculates an estimation value on the basis of the timing acquired from the carrier phase controller 272 and the information of the subcarrier acquired from the selector 274. The estimation value calculator 275 transmits the calculated estimation value to all compensators 273. The compensators 273 compensate for the phase of the carrier on the basis of the estimation value.

Figure 20:
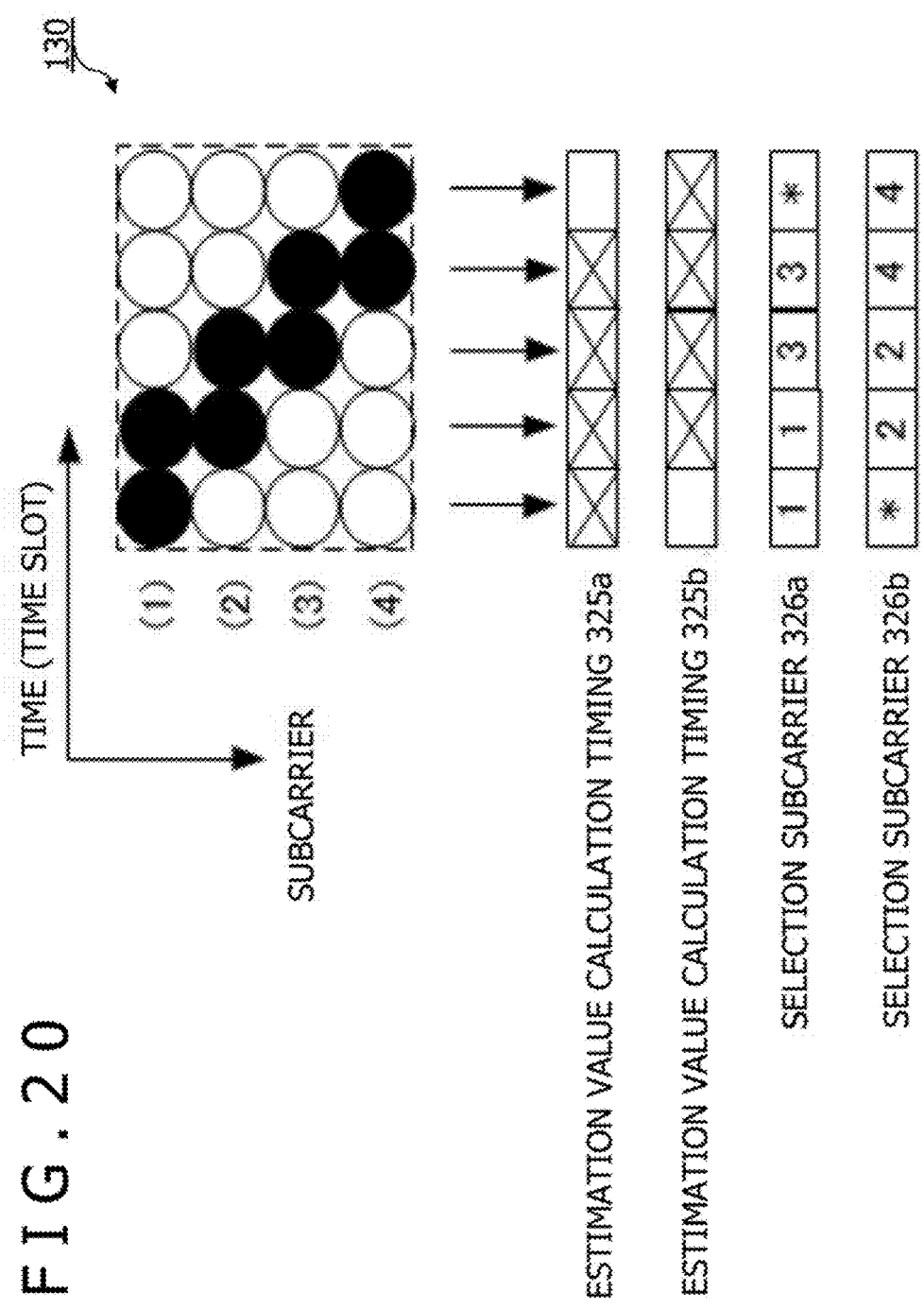
FIG. 20 is a view illustrating a further example (part 3) of processing of the carrier phase controller according to the first embodiment.

FIG. 20 is a view illustrating a further example (part 3) of processing of the carrier phase controller according to the first embodiment. Referring to FIG. 19, the carrier phase controller 272 controls an estimation value calculation timing 323 and the selection subcarrier 324 on the basis of one symbol at each timing of the transmission data 130. FIG. 20 depicts an example in which the carrier phase controller 272 does not select, even where symbols are placed at the same timing at a location of two subcarriers, one of the symbols but uses both symbols (subcarriers).

The carrier phase controller 272 controls the timing at which an estimation value is to be calculated by the estimation value calculator 275 on the basis of the transmission data 130. The timing at which an estimation value is to be calculated is a timing at which a symbol of the low multilevel degree is placed in the transmission data 130. An estimation value calculation timing 325a is a timing at which a symbol is placed in the subcarrier 1 and the subcarrier 3. Another estimation value calculation timing 325b is a timing at which a symbol is placed in the subcarrier 2 and the subcarrier 4.

The carrier phase controller 272 controls the subcarrier to be selected by the selector 274 on the basis of the transmission data 130. The carrier phase controller 272 controls the selector 274 to select the subcarriers in the order of "1, 1, 3, 3, none" as indicated by a selection subcarrier 326a (corresponding to the estimation value calculation timing 325a). Meanwhile, the carrier phase controller 272 controls, for example, the selector 274 to select the subcarriers in the order of "none, 2, 2, 4, 4" as indicated by another selection subcarrier 326b (corresponding to the estimation value calculation timing 325b).

The estimation value calculator 275 calculates an estimation value on the basis of the estimation value calculation timing 325a and the selection subcarrier 326a and further calculates an estimation value on the basis of the estimation value calculation timing 325b and the selection subcarrier 326b. Where two estimation values are calculated at the same timing, the estimation value calculator 275 calculates an average value of the two estimation values. The estimation value calculator 275 transmits the calculated estimation value to all compensators 273. The compensators 273 compensate for the phase of the carrier on the basis of the estimation value.

Second Embodiment

Figure 21:
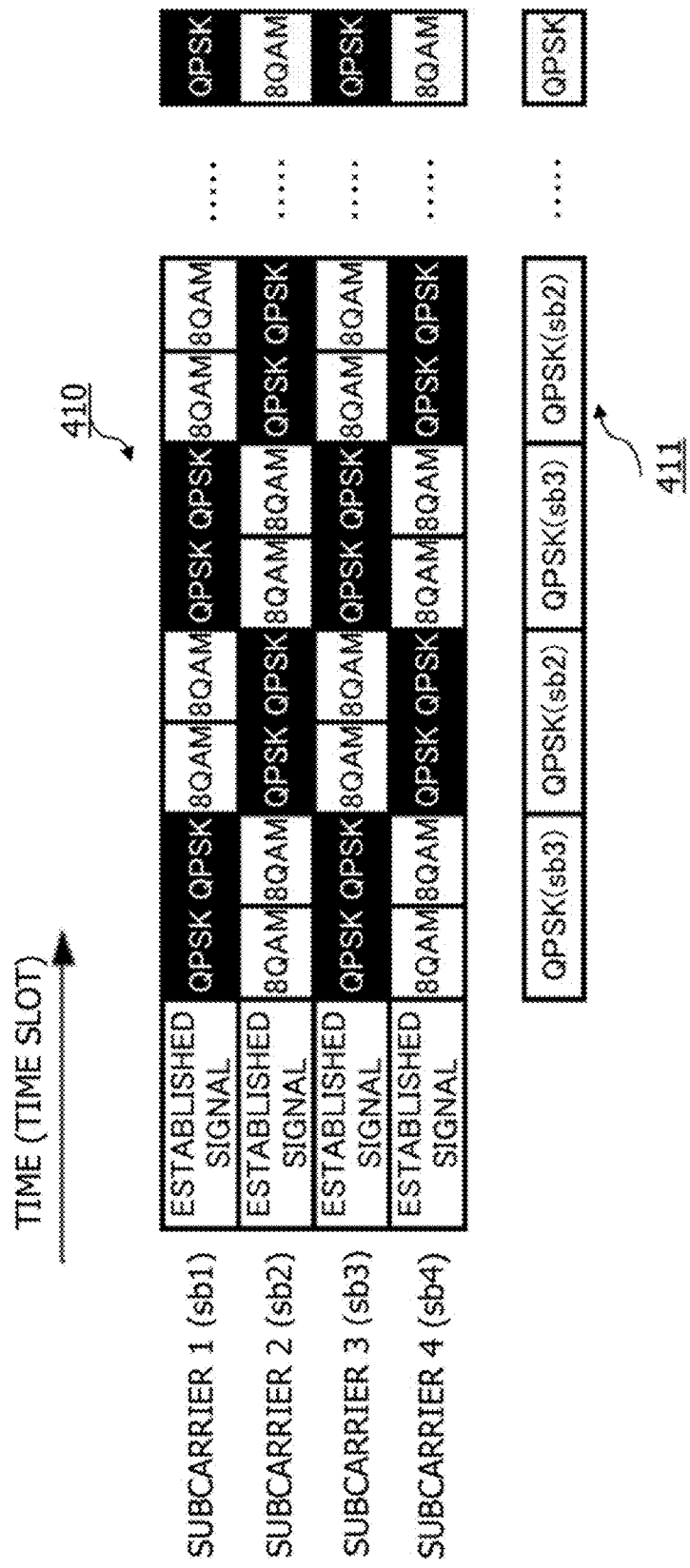
FIG. 21 is a view illustrating an example of transmission data according to a second embodiment.

FIG. 21 is a view illustrating an example of transmission data according to a second embodiment. Transmission data 410 according to the second embodiment are transmitted from a transmission apparatus having a configuration same as that of the transmission apparatus 100 of FIG. 1. In the transmission data 410, a symbol of the low multilevel degree is placed in a set of S(1, 1) and S(1, 2), another set of S(3, 1) and S(3, 2), a further set of S(2, 3) and S(2, 4), a still further set of S(4, 3) and S(4, 4), a yet further set of S(1, 5) and S(1, 6), a yet further set of S(3, 5) and S(3, 6), a yet further set of S(2, 7) and S(2, 8) and a yet further set of S(4, 7) and S(4, 8). The transmission apparatus 100 transmits the transmission data 410 such that two symbols of the QPSK data are transmitted successively and the subcarrier to be used for transmission of QPSK data is changed for every two symbols.

As recognized from the transmission data 410, the controller 104 uses first and second modulation formats in two or more subcarriers from among a plurality of subcarriers. Further, the controller 104 controls the modulation format such that the modulation format includes subcarriers between which, from between a timing of the first symbol and a timing of the second symbol from between two successive symbols that uses the first modulation format (for example, QPSK), at least one timing is different. In the second embodiment, the subcarrier that includes a QPSK symbol is different, for example, between the set of S(1, 1) and S(1, 2) and the set of S(2, 3) and S(2, 4), and further, both of the first and second symbols are different in timing from each other. Therefore, this satisfies the condition described above.

In use data 411 which are data to be used for calculation of an optical frequency offset value at the reception apparatus side, QPSK—that is one of the two subcarriers is selected at the same timing and used. Here, in the second embodiment, a bit error rate (BER) characteristic for each subcarrier is used such that a BER of a low error rate is given priority to select a subcarrier. QPSK symbols at all timings of the use data 411 are used to calculate an optical frequency offset value at a timing once for each twice. Further, phase rotation can be corrected using the same optical frequency offset value in all subcarriers. The transmission quality in the subcarriers in the subcarrier multiplexing transmission system can be uniformized as far as possible.

FIG. 22 is a block diagram depicting an example of a configuration of an adaptive equalizer according to the second embodiment. An adaptive equalizer 250' according to the second embodiment is configured such that the adaptive equalizer 250' includes a decider 501 additionally provided in the adaptive equalizer 250 according to the first embodiment. The decider 501 acquires a BER characteristic of each subcarrier in advance. Where symbols of the low multilevel degree are held in two subcarriers at the same timing, the decider 501 notifies the adaptive equalization controller 252 to select a symbol (subcarrier) at the side of the lower BER characteristic.

Figure 23:
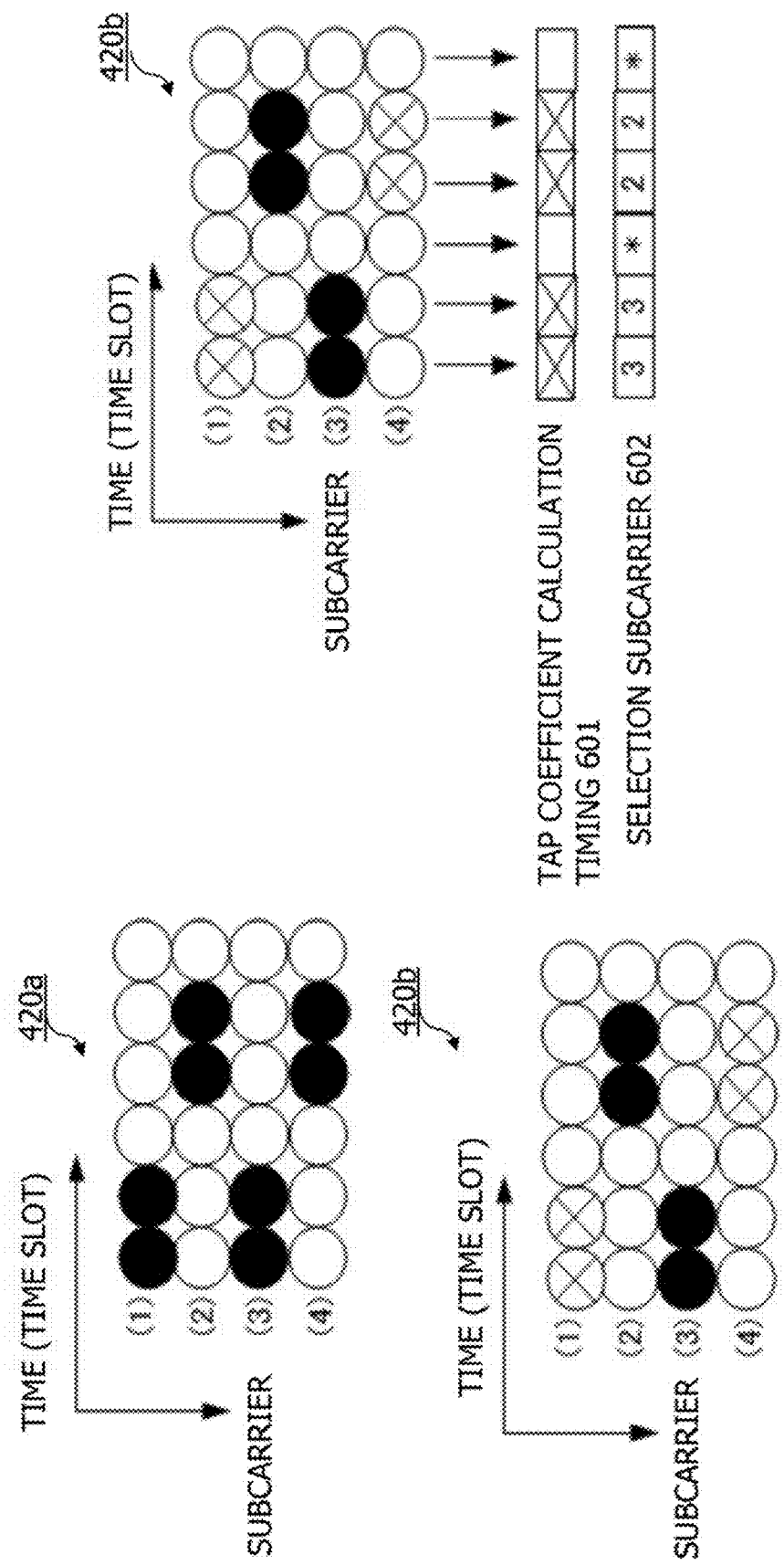
FIG. 23 is a view illustrating an example of processing of an adaptive equalization controller according to the second embodiment.

FIG. 23 is a view illustrating an example of processing of an adaptive equalization controller according to the second embodiment. The adaptive equalizer 250' receives transmission data 420a in which a symbol of the low multilevel degree is placed in a set of S(1, 1) and S(1, 2), another set of S(2, 4) and S(2, 5), a further set of S(3, 1) and S(3, 2) and a still further set of S(4, 4) and S(4, 5). The transmission data 420a hold a symbol of the low multilevel degree in the subcarrier 1 and the subcarrier 3 at the first and second timings and in the subcarrier 2 and the subcarrier 4 at the fourth and fifth timings in a period.

Where a symbol having the low multilevel degree is placed in a plurality of subcarriers at the same timing, the decider 501 selects one subcarrier on the basis of the BER characteristics. For example, it is assumed that subcarriers of low BER characteristics have an order of "2, 3, 1, 4." Consequently, the decider 501 compares the subcarrier 1 and the subcarrier 3 at the first and second timings within a period as indicated by transmission data 420b with each other and selects the subcarrier 3 having a lower BER characteristic. The decider 501 compares the subcarrier 2 and the subcarrier 4 at the fourth and fifth timings within the period as indicated by the transmission data 420b with each other and selects the subcarrier 2 having a lower BER characteristic. In the transmission data 420b, a symbol at the selected subcarrier side is indicated by a dark round mark, and a symbol of the subcarrier at the side not selected is indicated by a mark x surrounded by a circle.

The adaptive equalization controller 252 controls the timing at which the tap coefficient calculator 255 is to calculate a tap coefficient on the basis of the transmission data 420b after the decision made on the basis of the BER characteristics. The timing at which a tap coefficient is to be calculated is a timing at which a symbol (dark round mark) of the low multilevel degree is placed in the transmission data 420b. Therefore, a tap coefficient calculation timing 601 retains, at the first, second, fourth and fifth timings, a mark "x" indicative of a timing at which a tap coefficient is to be calculated.

The adaptive equalization controller 252 controls the subcarrier to be selected by the selector 254 and the selector 256 on the basis of the transmission data 420b. The subcarrier to be selected is a subcarrier in which the symbol (dark round mark) of the low multilevel degree is placed in the transmission data 420b. Consequently, the adaptive equalization controller 252 controls the selector 254 and the selector 256 to select the subcarriers in the order of "3, 3, none, 2, 2, none" as indicated by a selection subcarrier 602.

The tap coefficient calculator 255 calculates a tap coefficient on the basis of the timing acquired from the adaptive equalization controller 252 and information of the subcarrier acquired from the selector 254 or the selector 256. The tap coefficient calculator 255 transmits the calculated tap coefficient to all adaptive equalization filters 253. The adaptive equalization filters 253 remove inter-symbol interferences of the transmission data on the basis of the tap coefficient.

FIG. 24 is a block diagram depicting an example of a configuration of an optical frequency offset compensator according to the second embodiment. An optical frequency offset compensator 260' according to the second embodiment is configured such that a decider 502 is additionally provided in the optical frequency offset compensator 260 according to the first embodiment. The decider 502 acquires individual BER characteristics of the subcarriers in advance. Where symbols of the low multilevel degree are retained in the two subcarriers at the same timing, the decider 502 notifies the optical frequency offset controller 262 to select a symbol (subcarrier) at the side of the lower BER characteristic.

Figure 25:
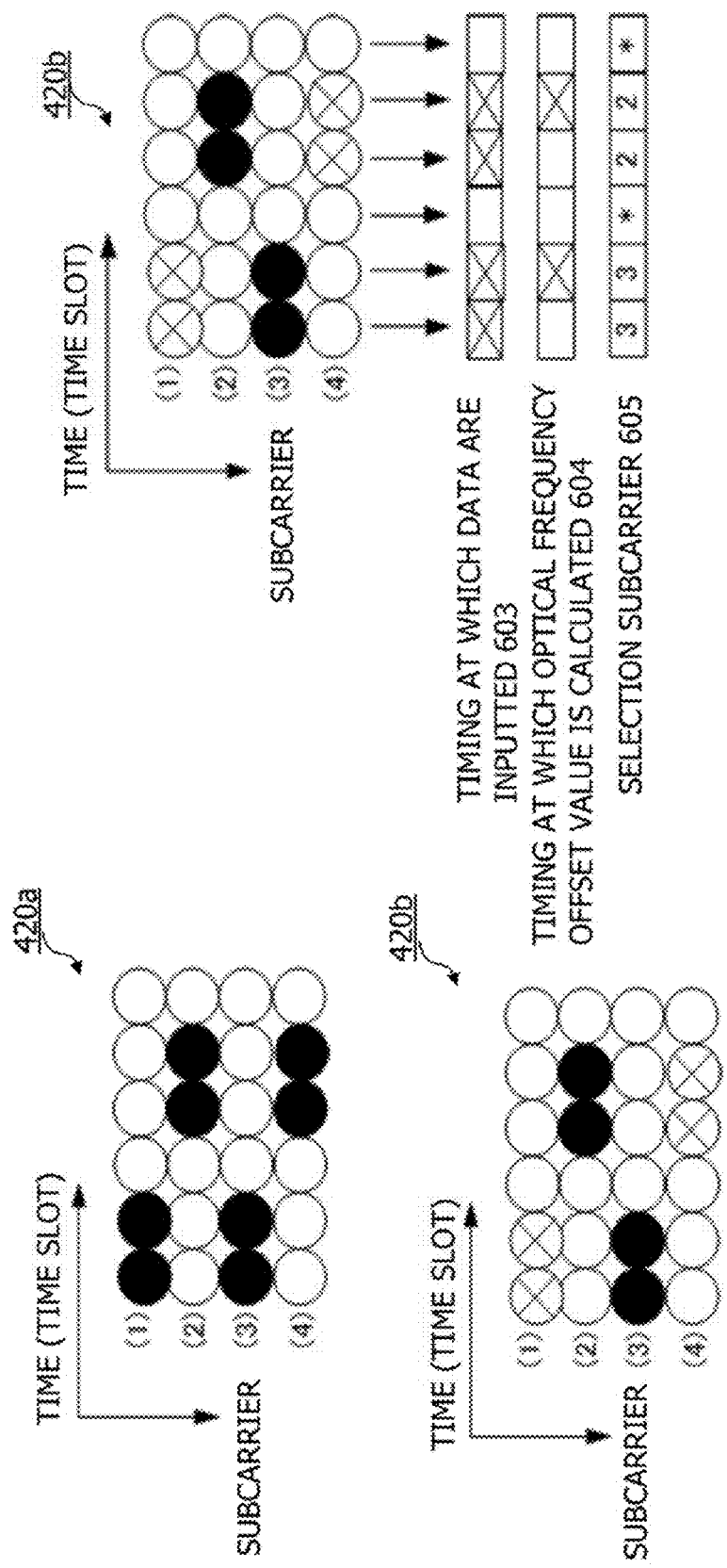
FIG. 25 is a view illustrating an example of processing of the optical frequency offset compensator according to the second embodiment.

FIG. 25 is a view illustrating an example of processing of the optical frequency offset compensator according to the second embodiment. The optical frequency offset compensator 260' receives transmission data 420a in which symbols of the low multilevel degree are placed in the order of a set of S(1, 1) and S(1, 2), another set of S(2, 4) and S(2, 5), a further set of S(3, 1) and S(3, 2) and a still further set of S(4, 4) and S(4, 5). The transmission data 420a hold a symbol of the low multilevel degree in the subcarrier 1 and the subcarrier 3 at the first and second timings and in the subcarrier 2 and the subcarrier 4 at the fourth and fifth timings within a period.

Where a symbol of the low multilevel degree is placed in a plurality of subcarriers at the same timing, the decider 502 selects one subcarrier on the basis of the BER characteristics. For example, it is assumed that subcarriers of low BER characteristics have an order of "2, 3, 1 and 4." In this case, the decider 502 compares the subcarrier 1 and the subcarrier 3 at the first and second timings within a period as indicated by transmission data 420b with each other and selects the subcarrier 3 having a lower BER characteristic. The decider 502 compares the subcarrier 2 and the subcarrier 4 at the fourth and fifth timings within the period as indicated by the transmission data 420b with each other and selects the subcarrier 2 having a lower BER characteristic. In the transmission data 420b, a symbol at the selected subcarrier side is indicated by a dark round mark, and a symbol of the subcarrier side not selected is indicated by a mark x surrounded by a circle.

The optical frequency offset controller 262 controls the timing at which the optical frequency offset calculator 265 is to acquire data (for example, an angle of a symbol and so forth) to be used for calculation of an optical frequency offset value on the basis of the transmission data 420b. The timing at which the optical frequency offset calculator 265 is to acquire data is a timing at which a symbol of the low multilevel degree is placed in the transmission data 420b. Consequently, the optical frequency offset calculator 265 acquires data at the timings "1, 2, 4 and 5" as indicated by a timing 603 at which data are inputted.

The optical frequency offset controller 262 controls the timing at which the optical frequency offset calculator 265 is to calculate an optical frequency offset value. Since the optical frequency offset uses an angular difference between two symbols or the like, every time two symbols are acquired, an optical frequency offset value can be calculated at a timing of one time (calculation timing 604). The calculation timing 604 represents the second and fifth timings from among the timings "1, 2, 4 and 5."

The optical frequency offset controller 262 controls the subcarrier to be selected by the selector 264 on the basis of the transmission data 420b. The subcarrier to be selected is a subcarrier in which a symbol of the low multilevel degree is placed in the transmission data 420b. Consequently, the optical frequency offset controller 262 controls the selector 264 to select the subcarriers in the order of "3, 3, none, 2, 2" as indicated by a selection subcarrier 605.

The optical frequency offset calculator 265 calculates an optical frequency offset value on the basis of the timings (timing 603 at which data are to be inputted and calculation timing 604) acquired from the optical frequency offset controller 262 and the information of a subcarrier acquired from the selector 264. The optical frequency offset calculator 265 transmits the calculated optical frequency offset value to all optical frequency offset equalizers 263. The optical frequency offset equalizers 263 remove phase rotation from the transmission data on the basis of the optical frequency offset value.

Figure 26:
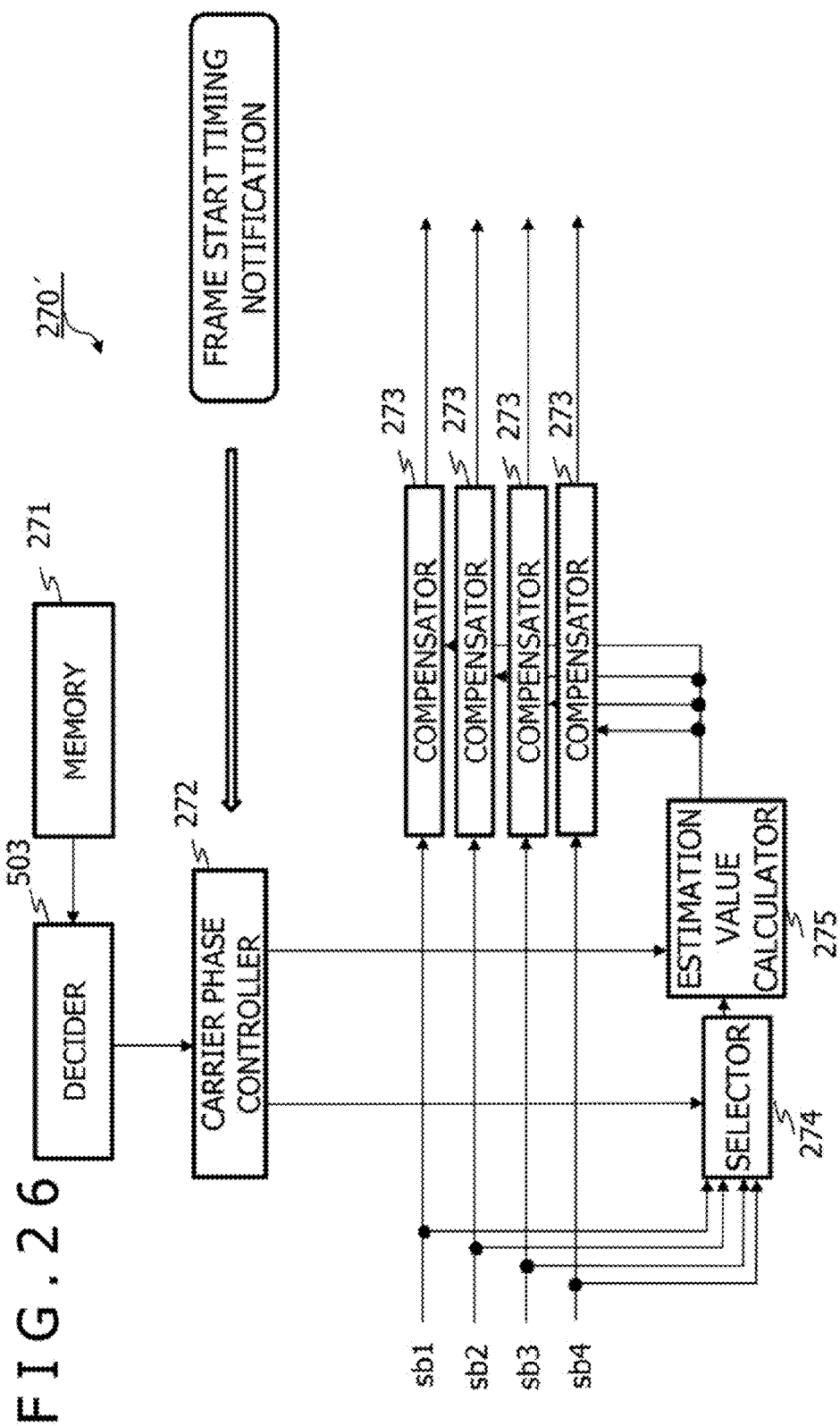
FIG. 26 is a block diagram depicting an example of a configuration of a carrier phase regenerator according to the second embodiment.

FIG. 26 is a block diagram depicting an example of a configuration of a carrier phase regenerator according to the second embodiment. A carrier phase regenerator 270' according to the second embodiment is configured such that the carrier phase regenerator 270 according to the first embodiment additionally includes a decider 503. The decider 503 acquires individual BER characteristics of the subcarriers. Where symbols of the low multilevel degree are retained in two subcarriers at the same timing, the decider 503 notifies the carrier phase controller 272 to select a symbol (subcarrier) at the side of the lower BER characteristic.

Figure 27:
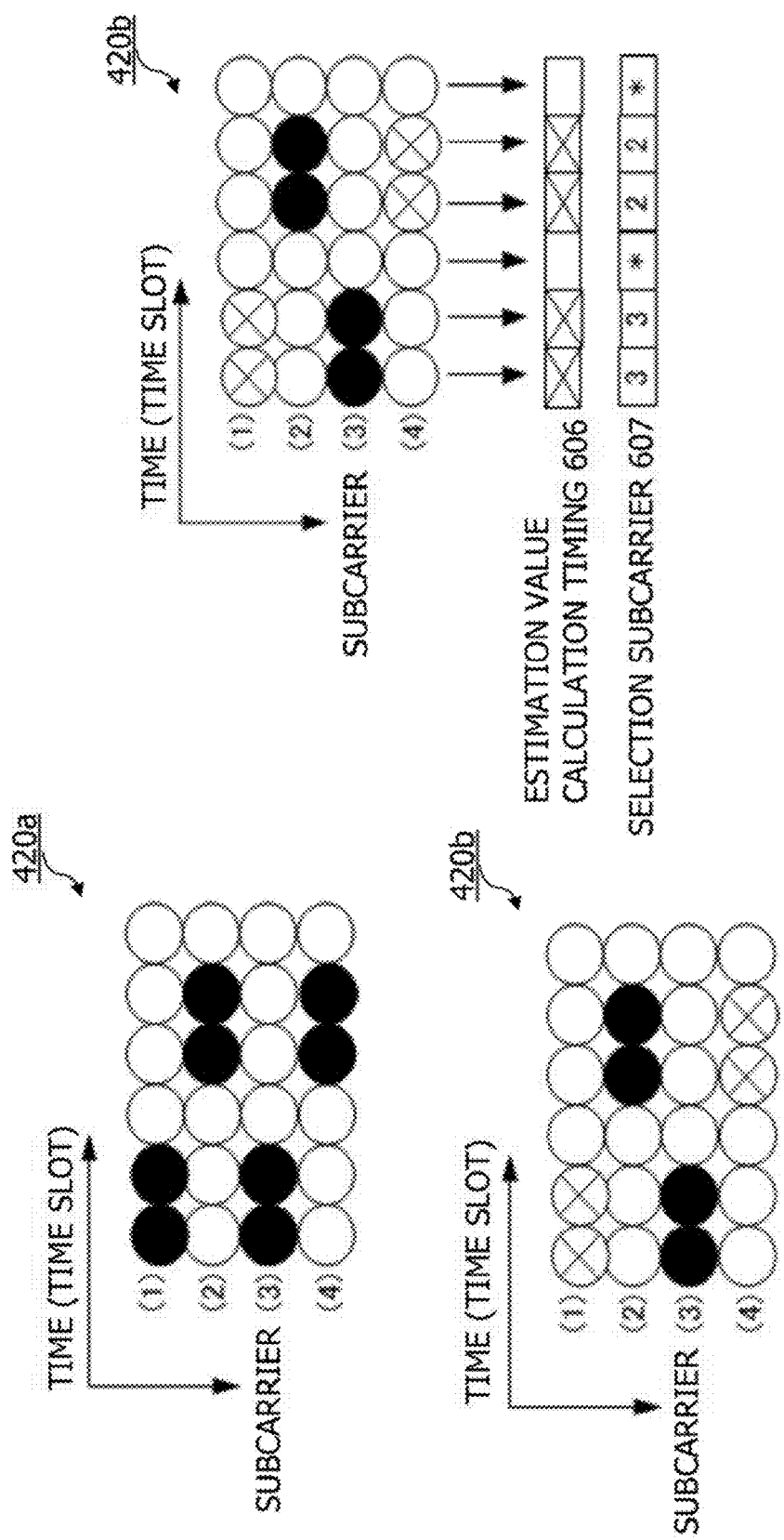
FIG. 27 is a view illustrating an example of processing of the carrier phase regenerator according to the second embodiment.

FIG. 27 is a view illustrating an example of processing of the carrier phase regenerator according to the second embodiment. The carrier phase regenerator 270' receives transmission data 420a in which a symbol of the low multilevel degree is placed in a set of S(1, 1) and S(1, 2), another set of S(2, 4) and S(2, 5), a further set of S(3, 1) and S(3, 2) and a still further set of S(4, 4) and S(4, 5). The transmission data 420a hold a symbol of the low multilevel degree in the subcarrier 1 and the subcarrier 3 at the first and second timings and in the subcarrier 2 and the subcarrier 4 at the fourth and fifth timings within a period.

Where a symbol of the low multilevel degree is placed in a plurality of subcarriers at the same timing, the decider 503 selects one subcarrier on the basis of the BER characteristics. For example, it is assumed that subcarriers of low BER characteristics have an order of "2, 3, 1, 4." In this case, the decider 503 compares the subcarrier 1 and the subcarrier 3 at the first and second timings within a period as indicated by transmission data 420b with each other and selects the subcarrier 3 having a lower BER characteristic. The decider 503 compares the subcarrier 2 and the subcarrier 4 at the fourth and fifth timings within the period as indicated by the transmission data 420b with each other and selects the subcarrier 2 having a lower BER characteristic. In the transmission data 420b, a symbol at the selected subcarrier side is indicated by a dark round mark, and a symbol of the subcarrier at the side not selected is indicated by a mark x surrounded by a circle.

The carrier phase controller 272 controls the timing at which an estimation value is to be calculated by the estimation value calculator 275 on the basis of the transmission data 420b after the decision made on the basis of the BER characteristics. The timing at which an estimation value is to be calculated is a timing at which a symbol (dark round mark) of the low multilevel degree is placed in the transmission data 420b. Therefore, a estimation value calculation timing 606 retains the mark "x," which represents a timing at which a tap coefficient is to be calculated, at the first, second, fourth and fifth timings.

The carrier phase controller 272 controls the subcarrier to be selected by the selector 274 on the basis of the transmission data 420b. The subcarrier to be selected is a subcarrier in which a symbol (dark round mark) of the low multilevel degree is placed in the transmission data 420b. Consequently, the carrier phase controller 272 controls the selector 274 to select the subcarriers in the order of "3, 3, none, 2, 2, none" as indicated by a selection subcarrier 607.

The estimation value calculator 275 calculates an estimation value on the basis of the timing acquired from the carrier phase controller 272 and the information of the subcarrier acquired from the selector 274. The estimation value calculator 275 transmits the calculated estimation value to all compensators 273. The compensators 273 compensate for the phase of the carrier on the basis of the estimation value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus configured to transmit an optical signal by using a plurality of subcarriers, the transmission apparatus comprising:
   a plurality of modulators, a modulator of the plurality of modulators configured to be capable of changing a modulation format corresponding to a subcarrier of the plurality of subcarriers;
   a controller configured to control the modulation format for the modulator so as to use a first modulation format and a second modulation format for each of two or more subcarriers among the plurality of subcarriers, the two or more subcarriers being modulated using the first modulation format at different times within a symbol transmission period; and
   a multiplexer configured to multiplex signals modulated by the plurality of modulators.

2. The transmission apparatus according to claim 1, wherein the first modulation format has a multilevel degree lower than a multilevel degree of the second modulation format.

3. The transmission apparatus according to claim 1, wherein the two or more subcarriers include subcarriers that are modulated using different modulation formats from a subcarrier among the two or more subcarriers being modulated using the first modulation format in at least one of a first time period and a second time period within the symbol transmission period, and
   the first time period and the second time period are time periods at which successive symbols are transmitted by using the first modulation format.

4. The transmission apparatus according to claim 1, wherein the first modulation format is applied to at least two symbols in each of the plurality of subcarriers.

5. A reception apparatus comprising:
   a receiver configured to receive an optical signal transmitted by using a plurality of subcarriers, a first modulation format and a second modulation format being applied to each of two or more subcarriers among the plurality of subcarriers, the two or more subcarriers being modulated using the first modulation format at different times within a symbol transmission period;
   a selector configured to select a subcarrier that includes the first modulation format among the plurality of subcarriers included in the optical signal received by the receiver;
   a calculator configured to calculate a correction value based on symbols in the subcarrier selected by the selector; and
   a compensator configured to compensate for each of the plurality of subcarriers based on the correction value.

6. The reception apparatus according to claim 5, wherein the first modulation format has a multilevel degree lower than a multilevel degree of the second modulation format.

7. The reception apparatus according to claim 5, wherein the calculator selects a subcarrier that includes the first modulation format among the plurality of subcarriers included in the optical signal received by the receiver and calculates an optical frequency offset value using symbols in the selected subcarrier to calculate the correction value.

8. The reception apparatus according to claim 7, wherein the calculator calculates, at a timing at which there are a plurality of subcarriers that include the first modulation format, an average value of optical frequency offset values.

9. The reception apparatus according to claim 5, wherein the calculator selects a subcarrier that includes the first modulation format among the plurality of subcarriers included in the optical signal received by the receiver and calculates a tap coefficient using symbols in the selected subcarrier to calculate the correction value; and wherein the compensator removes inter-symbol interferences between the plurality of subcarriers based on the tap coefficient to compensate for each of the plurality of subcarriers.

10. The reception apparatus according to claim 9, wherein the calculator calculates, at a timing at which there are a plurality of subcarriers that include the first modulation format, an average value of tap coefficients.

11. The reception apparatus according to claim 5, wherein the calculator selects a subcarrier that includes the first modulation format among the plurality of subcarriers included in the optical signal received by the receiver and calculates an estimation value of a carrier phase using symbols in the selected subcarrier; and the compensator compensates for a phase of each of the plurality of subcarrier based on the estimation value of the carrier phase.

12. The reception apparatus according to claim 11, wherein the calculator calculates, at a timing at which there are a plurality of subcarriers that include the first modulation format, an average value of estimation values of the carrier phase.

13. The reception apparatus according to claim 5, wherein the calculator selects the subcarrier that includes the first modulation format based on a bit error rate.

14. A modulation method for an optical signal transmitted by using a plurality of subcarriers, the modulation method comprising:

controlling a modulation format so as to use a first modulation format and a second modulation format for each of two or more subcarriers among the plurality of subcarriers; and controlling the modulation format so as the two or more subcarriers are modulated using the first modulation format at different times within a symbol transmission period.

15. The modulation method according to claim 14, wherein the first modulation format has a multilevel degree lower than a multilevel degree of the second modulation format.

* * * * *